(12) United States Patent
Higaki et al.

(10) Patent No.: US 7,593,552 B2
(45) Date of Patent: Sep. 22, 2009

(54) GESTURE RECOGNITION APPARATUS, GESTURE RECOGNITION METHOD, AND GESTURE RECOGNITION PROGRAM

(75) Inventors: Nobuo Higaki, Saitama (JP); Takamichi Shimada, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 786 days.

(21) Appl. No.: 10/805,392

(22) Filed: Mar. 22, 2004

(65) Prior Publication Data

US 2004/0190776 A1 Sep. 30, 2004

(30) Foreign Application Priority Data

Mar. 31, 2003 (JP) ............... 2003-096271
Mar. 31, 2003 (JP) ............... 2003-096520

(51) Int. Cl.
*G06K 9/00* (2006.01)

(52) U.S. Cl. ............ 382/118; 382/115; 382/103; 382/154; 715/863

(58) Field of Classification Search .......... 382/118
See application file for complete search history.

(56) References Cited

U.S. PATENT DOCUMENTS

| | | | | |
|---|---|---|---|---|
| 5,774,591 | A * | 6/1998 | Black et al. | 382/236 |
| 6,009,210 | A * | 12/1999 | Kang | 382/276 |
| 6,385,331 | B2 * | 5/2002 | Harakawa et al. | 382/106 |
| 6,721,444 | B1 * | 4/2004 | Gu et al. | 382/154 |
| 2002/0064307 | A1 * | 5/2002 | Koga et al. | 382/176 |
| 2002/0181773 | A1 * | 12/2002 | Higaki et al. | 382/190 |

FOREIGN PATENT DOCUMENTS

| | | |
|---|---|---|
| JP | 06-96047 A | 4/1994 |
| JP | 8-263629 | 10/1996 |
| JP | 8-279044 A | 10/1996 |
| JP | 10-63864 | 3/1998 |
| JP | 10-149447 A | 6/1998 |

(Continued)

OTHER PUBLICATIONS

Pavlovic et al., "Visual Interpretation of Hand Gestures for Human-Computer Interaction: A Review", Jul. 1997, IEEE, vol. 19, No. 7, pp. 677-695.*

(Continued)

*Primary Examiner*—Samir A. Ahmed
*Assistant Examiner*—Edward Park
(74) *Attorney, Agent, or Firm*—Squire Sanders & Dempsey L.L.P.

(57) ABSTRACT

A gesture recognition apparatus for recognizing postures or gestures of an object person based on images of the object person captured by cameras. The gesture recognition apparatus includes: a face/fingertip position detection means which detects a face position and a fingertip position of the object person in three-dimensional space based on contour information and human skin region information of the object person to be produced by the images captured; and a posture/gesture recognition means which operates to detect changes of the fingertip position by a predetermined method, to process the detected results by a previously stored method, to determine a posture or a gesture of the object person, and to recognize a posture or a gesture of the object person.

12 Claims, 28 Drawing Sheets

FOREIGN PATENT DOCUMENTS

| | | | |
|---|---|---|---|
| JP | 2967088 | | 8/1999 |
| JP | 2000-149025 | | 5/2000 |
| JP | WO00/57129 | * | 9/2000 |
| JP | 2001-156930 | | 6/2001 |
| JP | 2002-366958 A | | 12/2002 |
| JP | 2003-39365 A | | 2/2003 |

OTHER PUBLICATIONS

Kang-Hyun Jo, et al., *"Interaction Between Agents from Recognition of Face Direction and Hand Gestures in the Virtual Space"*, IEEE, vol. 2, Jun. 27-Jul. 1, 2000, pp. 28-33.

Sakagami Y. et al., *The Intelligent ASIMO: System Overview and Integration*, IEEE, vol. 1 of 3, Sep. 30, 2002, pp. 2478-2483.

* cited by examiner

FIG. 3
(a) DISTANCE IMAGE D1
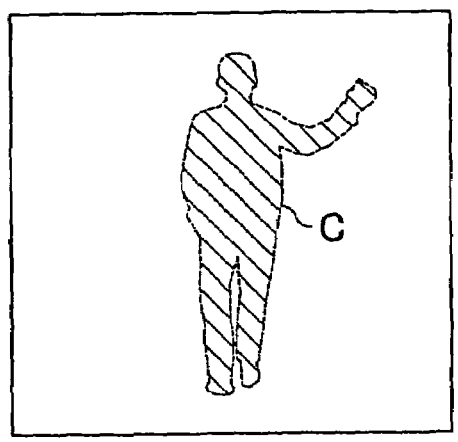
(c) EDGE IMAGE D3
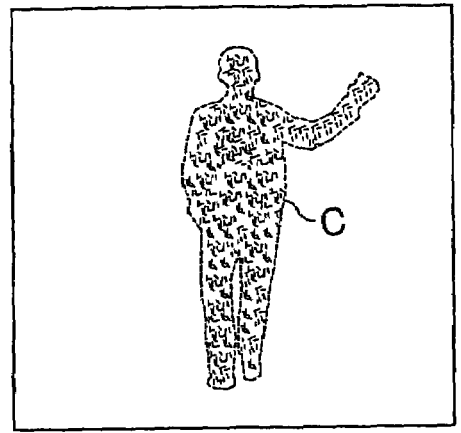
(b) DIFFERENCE IMAGE D2
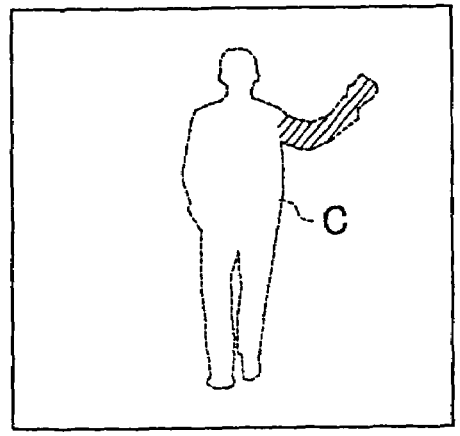
(d) HUMAN SKIN REGIONS R1, R2
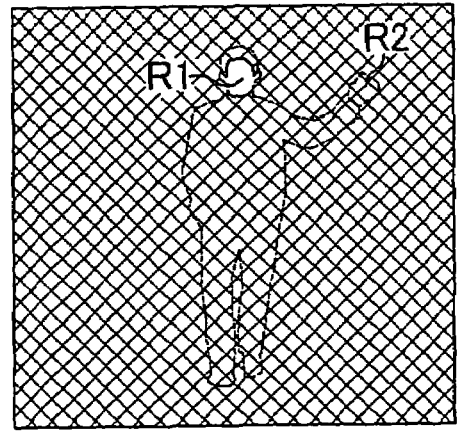

FIG. 4
(a) SETTING OBJECT DISTANCE
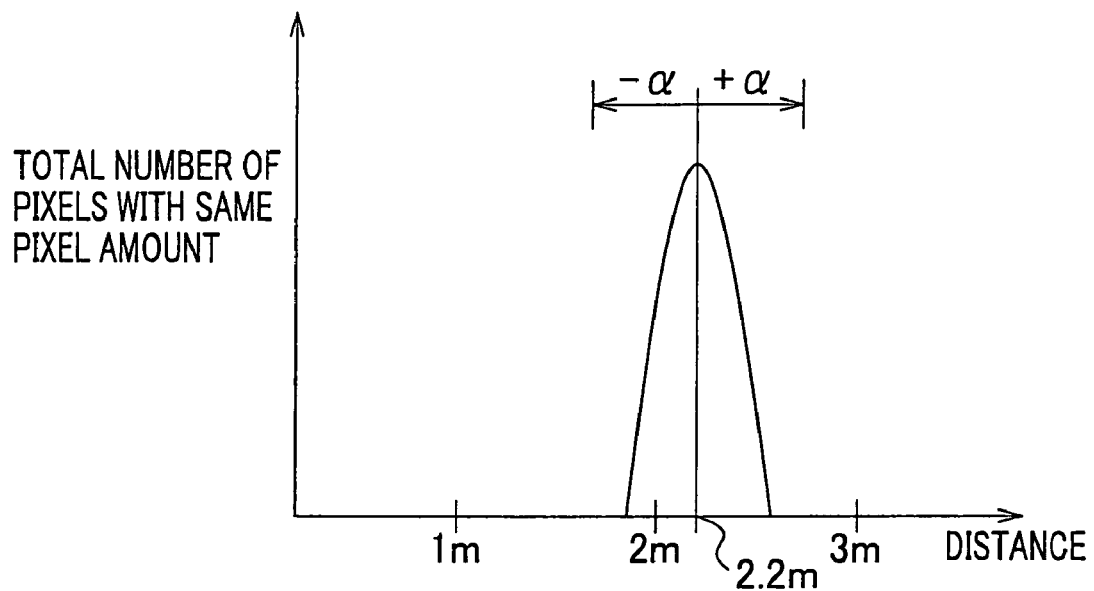
(b) PRODUCING OBJECT DISTANCE IMAGE D4
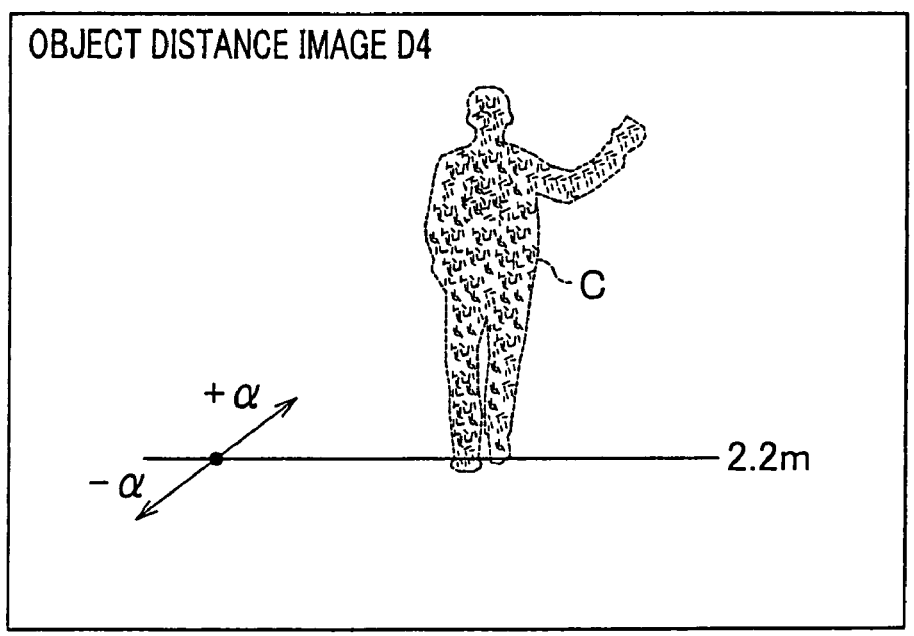

FIG. 5
(a) SETTING OBJECT REGION T (1)
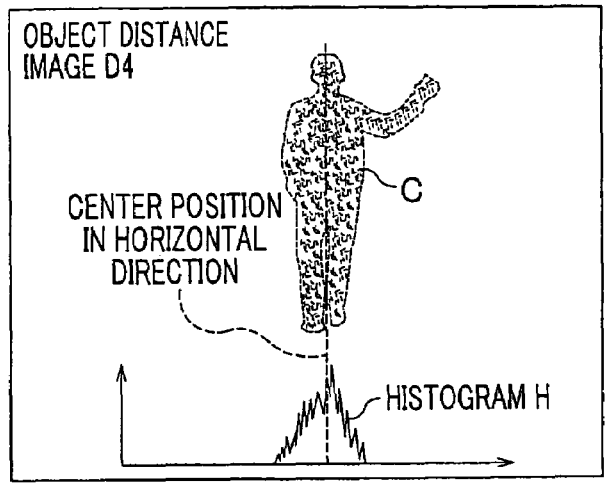
(b) SETTING OBJECT REGION T (2)
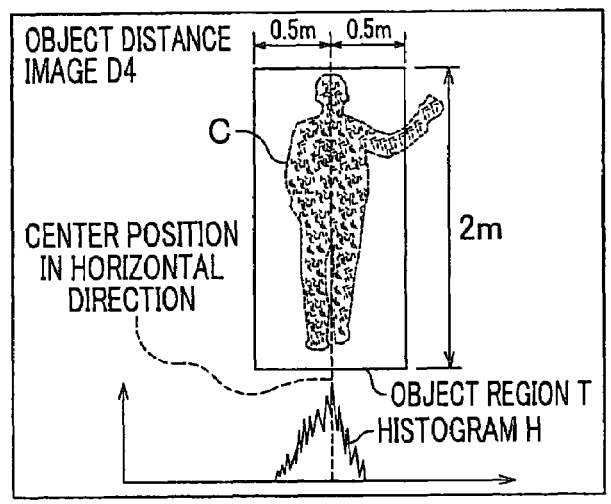
(c) EXTRACTING CONTOUR O
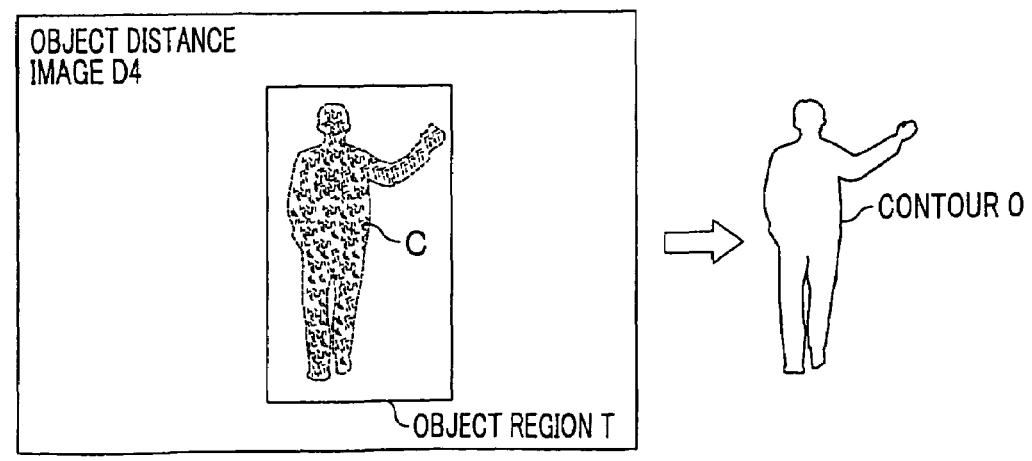

FIG. 7
(a) DETECTING HEAD TOP POSITION m1
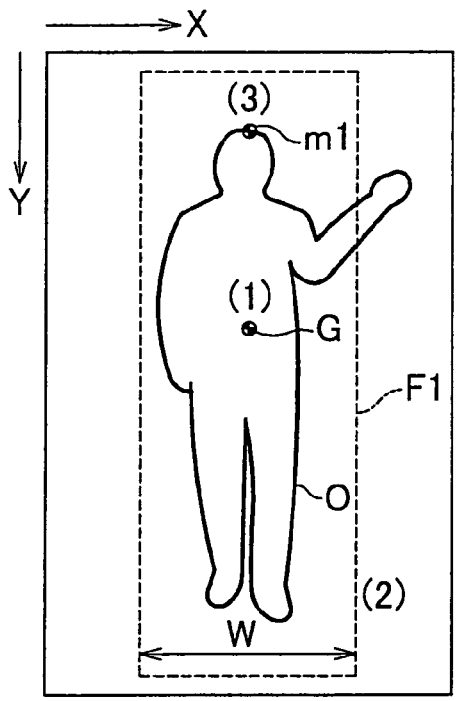
(b) DETECTING FACE POSITION m2
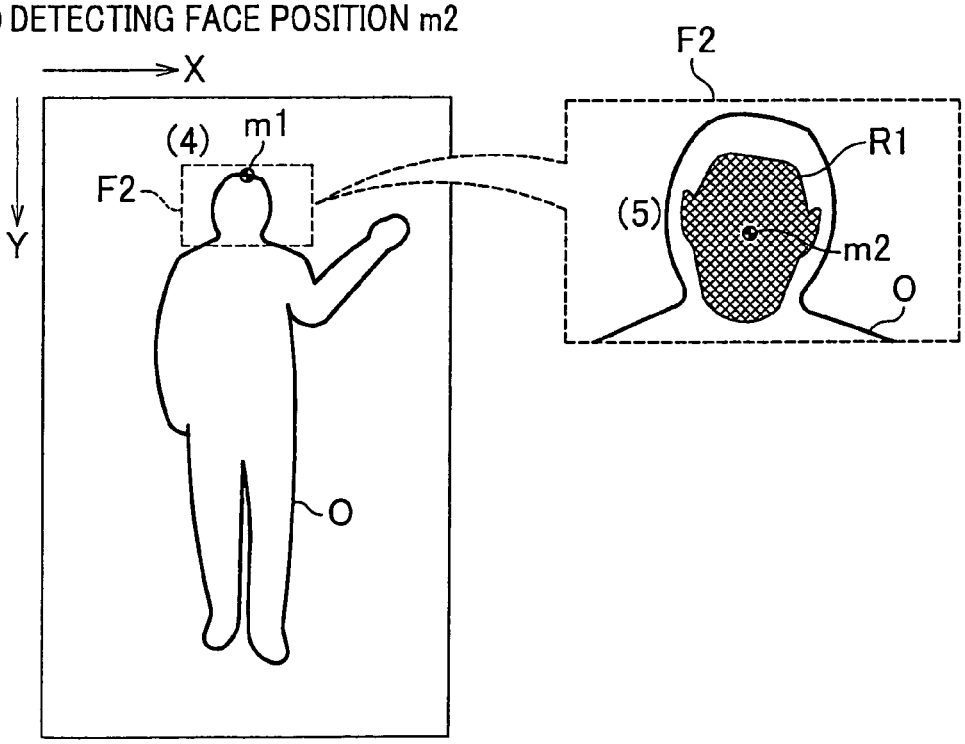

FIG. 8
(a) DETECTING ARM/HAND POSITION m3
(b) DETECTING HAND FINGERTIP POSITION m4
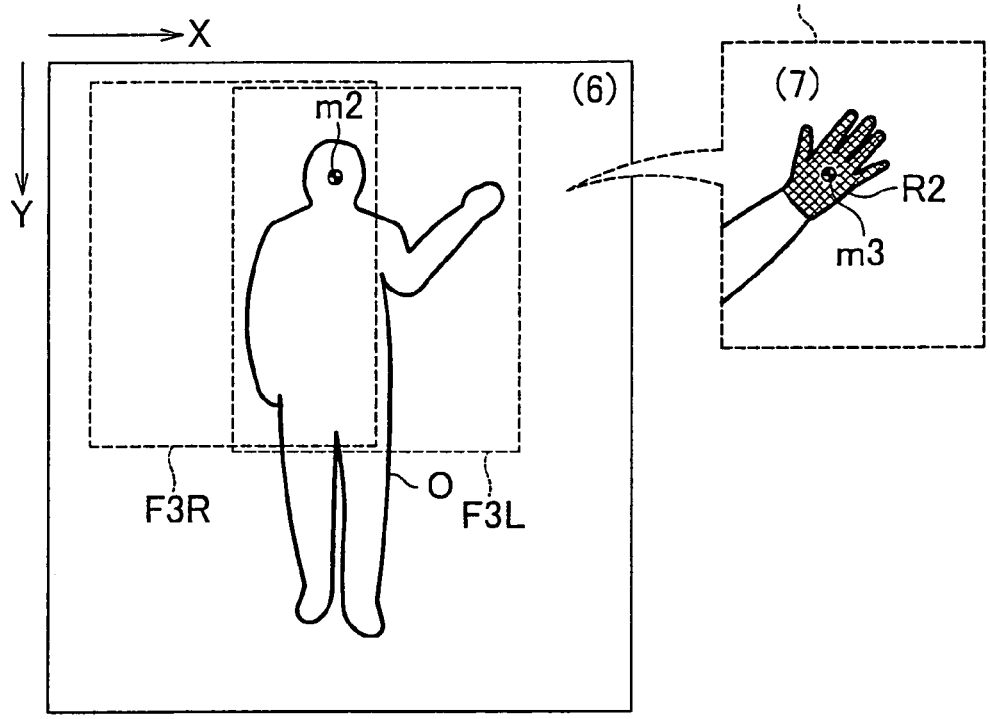
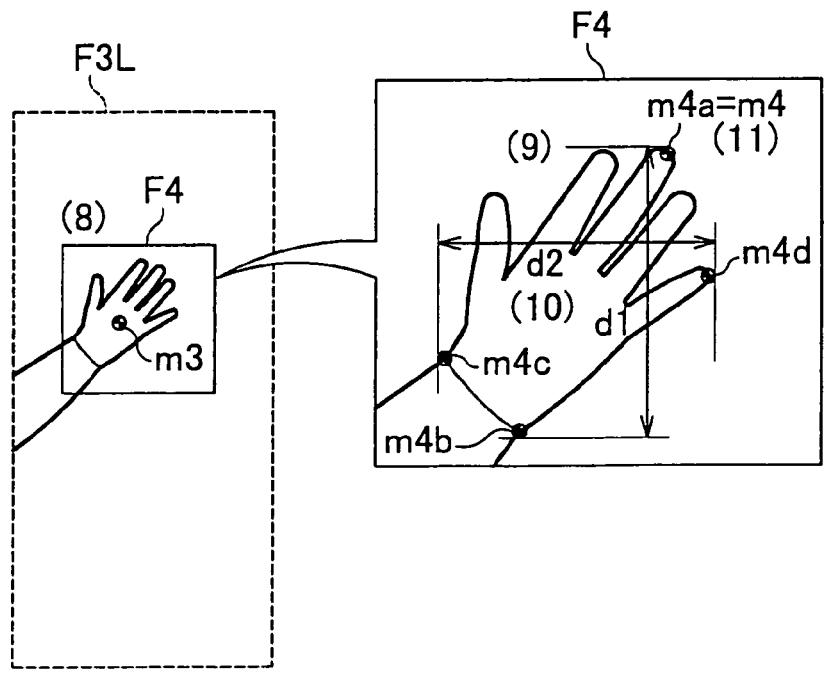

FIG. 9
(a) (P1:FACE SIDE)
(d) (P4:HANDSHAKE)
(b) (P2:HIGH HAND)
(e) (P5:SIDE HAND)
(c) (P3:STOP)
(f) (P6:LOW HAND)

FIG. 10
(a) (J1:HAND SWING)
(c) (J3:COME HERE)
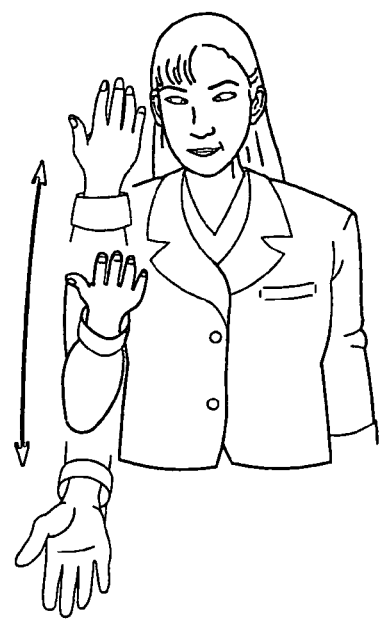
(b) (J2:BYE BYE)
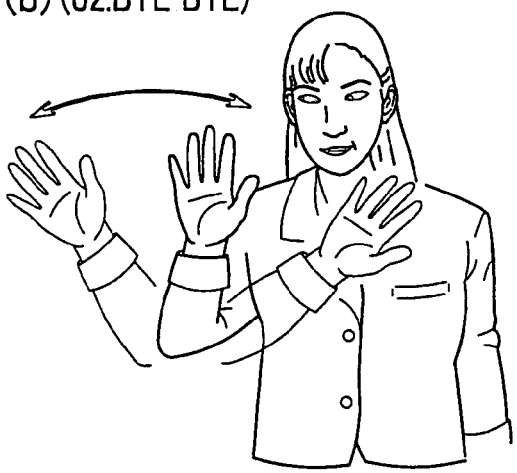
(d) (J4:HAND CIRCLING)

OUTLINE OF PROCESS AT POSTURE/GESTURE RECOGNIZING SECTION 42B

MODIFICATION 1 OF PROCESS AT POSTURE/GESTURE RECOGNIZING SECTION 42B

FIG. 16
(a) (P11:FACE SIDE)
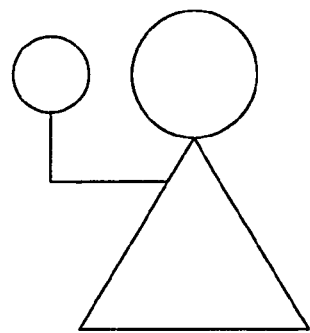
(d) (P14:HANDSHAKE)
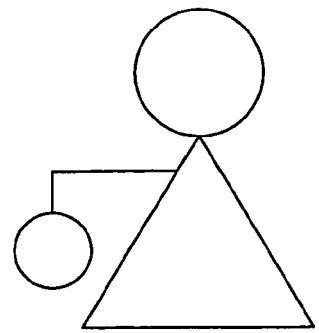
(b) (P12:HIGH HAND)
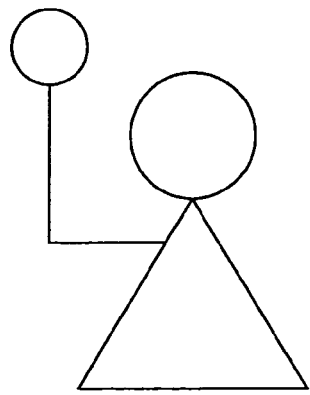
(e) (P15:SIDE HAND)
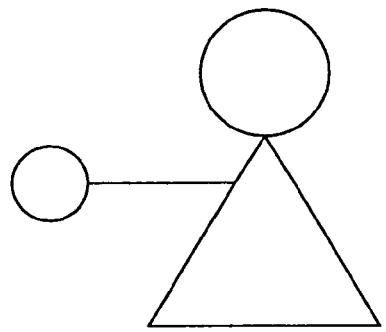
(c) (P13:STOP)
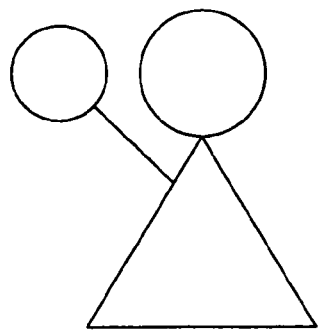
(f) (P16:LOW HAND)
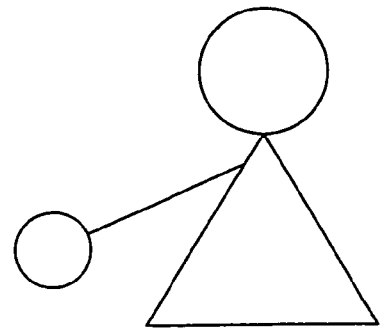

FIG. 17
(a) (J11:HAND SWING)
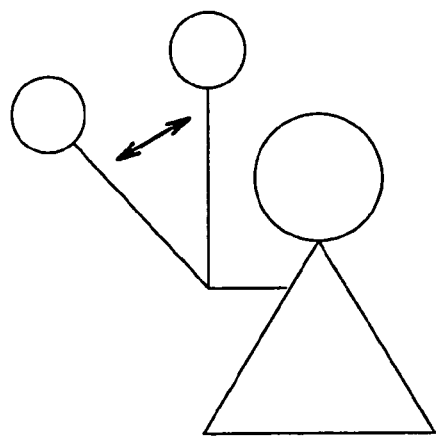
(b) (J12:BYE BYE)
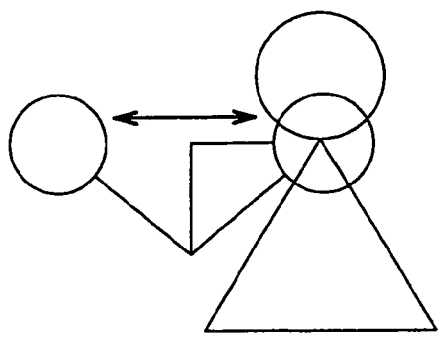
(c) (J13:COME HERE)
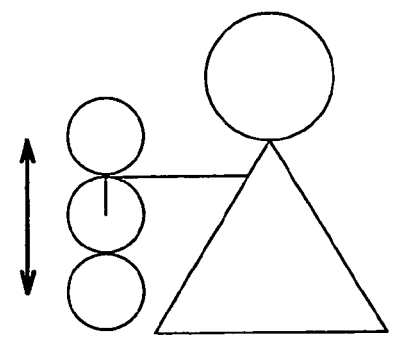
(d) (J14:HAND CIRCLING)
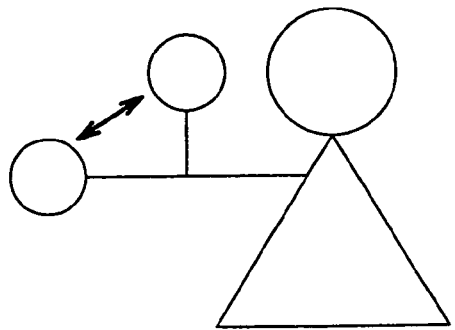

MODIFICATION 2 OF PROCESS AT POSTURE/GESTURE RECOGNIZING SECTION 42B

FIG. 19
(a)
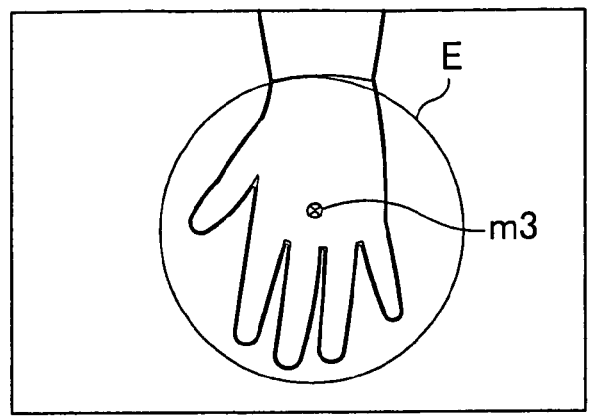
SETTING DETERMINATION CIRCLE E
(b)
$Sh \geqq \frac{1}{2} S$
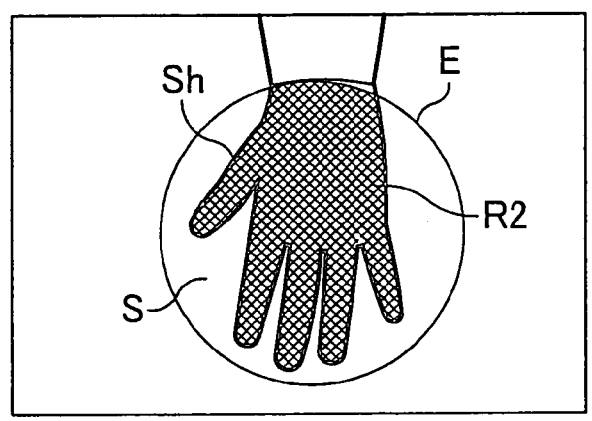
(c)
$Sh < \frac{1}{2} S$
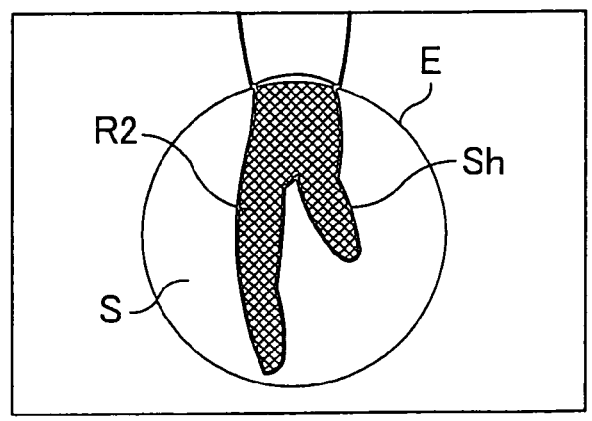

OPERATION (1) OF GESTURE RECOGNITION SYSTEM A2

OPERATION (2) OF GESTURE RECOGNITION SYSTEM A2

GESTURE RECOGNITION APPARATUS, GESTURE RECOGNITION METHOD, AND GESTURE RECOGNITION PROGRAM

BACKGROUND OF THE INVENTION

The present invention relates to an apparatus, a method, and a program for recognizing postures or gestures of an object person from images of the object person captured by cameras.

As disclosed in Japanese Laid-open Patent Application No.2000-149025 (pages 3-6, and FIG. 1), various gesture recognition methods have been proposed, in which feature points indicating an object person's motion feature are detected from images of the object person captured by cameras to estimate the gesture of the object person based on the feature points.

However, in this conventional gesture recognition method, it is necessary to calculate probabilities of gestures or postures of the object person based on the feature points whenever a gesture of the object person is recognized. This disadvantageously requires a large amount of calculations for the posture recognition process or the gesture recognition process.

With the foregoing drawback of the conventional art in view, the present invention seeks to provide a gesture recognition apparatus, a gesture recognition method, and a gesture recognition program, which can decrease the calculation process upon recognizing postures or gestures.

SUMMARY OF THE INVENTION

According to the present invention, there is provided a gesture recognition apparatus for recognizing postures or gestures of an object person based on images of the object person captured by cameras, comprising:

a face/fingertip position detection means which detects a face position and a fingertip position of the object person in three-dimensional space based on contour information and human skin region information of the object person to be produced by the images captured; and a posture/gesture recognition means which operates to detect changes of the fingertip position by a predetermined method, to process the detected results by a previously stored method, to determine a posture or a gesture of the object person, and to recognize a posture or a gesture of the object person.

According to one aspect of the present invention, the predetermined method is to detect a relative position between the face position and the fingertip position and changes of the fingertip position relative to the face position, and the previously stored method is to compare the detected results with posture data or gesture data previously stored.

In the gesture recognition apparatus, the face/fingertip position detection means detects a face position and a fingertip position of the object person in three-dimensional space based on contour information and human skin region information of the object person to be produced by the images captured. The posture/gesture recognition means then detects a relative position between the face position and the fingertip position based on the face position and the fingertip position and also detects changes of the fingertip position relative to the face position. The posture/gesture recognition means recognizes a posture or a gesture of the object person by way of comparing the detected results with posture data or gesture data indicating postures or gestures corresponding to "the relative position between the face position and the fingertip position" and "the changes of the fingertip position relative to the face position".

To be more specific, "the relative position between the face position and the fingertip position" detected by the posture/gesture recognition means indicates "height of the face position and height of the fingertip position" and "distance of the face position from the cameras and distance of the fingertip position from the cameras". With this construction, the posture/gesture recognition means can readily detect "the relative position between the face position and the fingertip position" by the comparison between "the height of the face position" and "the height of the fingertip position" and the comparison between "the distance of the face position from the cameras" and "the distance of the fingertip position from the cameras". Further, the posture/gesture recognition means can detect "the relative position between the face position and the fingertip position" from "the horizontal deviation of the face position and the fingertip position on the image".

The posture/gesture recognition means may recognize postures or gestures of the object person by means of pattern matching. In this construction, the posture/gesture recognition means can readily recognize postures or gestures of the object person by comparing input patterns including "the relative position between the face position and the fingertip position" and "the changes of the fingertip position relative to the face position" with posture data or gesture data previously stored, and by selecting the most similar pattern.

Further, the posture/gesture recognition means may set a determination region with a sufficient size for a hand of the object person and compare an area of the hand with an area of the determination region to distinguish similar postures or gestures which are similar in relative position between the face position and the fingertip position. In this construction, for example, the posture/gesture recognition means can distinguish the "HANDSHAKE" posture (FIG. 9(d)) and the "COME HERE" gesture (FIG. 10(c)), which are similar to each other and difficult to distinguish as they are common in that the height of the fingertip position is lower than the face position and that the distance of the fingertip position from the cameras is shorter than the distance of the face position from the cameras. To be more specific, if the area of the hand is greater than a half of the area of the determination circle as the determination region, the posture/gesture recognition means determines the gesture or posture as "COME HERE". Meanwhile, if the area of the hand is equal to or smaller than a half of the area of the determination circle, the posture/gesture recognition means determines the gesture or posture as "HANDSHAKE".

According to another aspect of the present invention, the predetermined method is to calculate a feature vector from an average and variance of a predetermined number of frames for an arm/hand position or a hand fingertip position, and the previously stored method is to calculate for all postures or gestures a probability density of posteriori distributions of each random variable based on the feature vector and by means of a statistical method so as to determine a posture or a gesture with a maximum probability density.

In this gesture recognition apparatus, the face/fingertip position detection means detects a face position and a fingertip position of the object person in three-dimensional space based on contour information and human skin region information of the object person to be produced by the images captured. The posture/gesture recognition means then calculates, from the fingertip position and the face position, an average and variance of a predetermined number of frames (e.g. 5 frames) for the fingertip position relative to the face position as a "feature vector". Based on the obtained feature vector and by means of a statistical method, the posture/gesture recognition means calculates for all postures and gestures a probability density of posteriori distributions of each random variable, and determines a posture or a gesture with the maximum probability density for each frame, so that the posture or the gesture with the maximum probability density is recognized as the posture or the gesture in the corresponding frame.

The posture/gesture recognition means may recognize a posture or a gesture of the object person when a same posture or gesture is repeatedly recognized for a certain times or more in a certain number of frames.

According to the present invention, there is also provided a gesture recognition method for recognizing postures or gestures of an object person based on images of the object person captured by cameras, comprising:

a face/fingertip position detecting step for detecting a face position and a fingertip position of the object person in three-dimensional space based on contour information and human skin region information of the object person to be produced by the images captured; and a posture/gesture recognizing step for detecting changes of the fingertip position by a predetermined method, processing the detected results by a previously stored method, determining a posture or a gesture of the object person, and recognizing a posture or a gesture of the object person.

According to one aspect of the present invention, the predetermined method is to detect a relative position between the face position and the fingertip position and changes of the fingertip position relative to the face position, and the previously stored method is to compare the detected results with posture data or gesture data previously stored.

According to this gesture recognition method, in the face/fingertip position detecting step, the face position and the fingertip position of the object person in three-dimensional space are detected based on contour information and human skin region information of the object person to be produced by the images captured. Next, in the posture/gesture recognizing step, "the relative position between the face position and the fingertip position" and "changes of the fingertip position relative to the face position" are detected from the face position and the fingertip position. Thereafter, the detected results are compared with posture data or gesture data indicating postures or gestures corresponding to "the relative position between the face position and the fingertip position" and "the changes of the fingertip position relative to the face position", to thereby recognize postures or gestures of the object person.

According to another aspect of the present invention, the predetermined method is to calculate a feature vector from an average and variance of a predetermined number of frames for an arm/hand position or a hand fingertip position, and the previously stored method is to calculate for all postures or gestures a probability density of posteriori distributions of each random variable based on the feature vector and by means of a statistical method so as to determine a posture or a gesture with a maximum probability density.

According to this gesture recognition method, in the face/fingertip position detecting step, the face position and the fingertip position of the object person in three-dimensional space are detected based on contour information and human skin region information of the object person to be produced by the images captured. Next, in the posture/gesture recognizing step, as a "feature vector", the average and variance of a predetermined number of frames for the fingertip position relative to the face position are calculated from the fingertip position and the face position. Based on the obtained feature vector and by means of a statistical method, a probability density of posteriori distributions of each random variable is calculated for all postures and gestures, and the posture or the gesture with the maximum probability density is recognized as the posture or the gesture in the corresponding frame.

According to the present invention, there is provided a gesture recognition program which makes a computer recognize postures or gestures of an object person based on images of the object person captured by cameras, the gesture recognition program allowing the computer to operate as:

a face/fingertip position detection means which detects a face position and a fingertip position of the object person in three-dimensional space based on contour information and human skin region information of the object person to be produced by the images captured; and a posture/gesture recognition means which operates to detect changes of the fingertip position by a predetermined method, to process the detected results by a previously stored method, to determine a posture or a gesture of the object person, and to recognize a posture or a gesture of the object person.

According to one aspect of the present invention, the predetermined method is to detect a relative position between the face position and the fingertip position and changes of the fingertip position relative to the face position, and the previously stored method is to compare the detected results with posture data or gesture data previously stored.

In this gesture recognition program, the face/fingertip position detection means detects a face position and a fingertip position of the object person in three-dimensional space based on contour information and human skin region information of the object person to be produced by the images captured. The posture/gesture recognition means then detects a relative position between the face position and the fingertip position based on the face position and the fingertip position and also detects changes of the fingertip position relative to the face position. The posture/gesture recognition means recognizes a posture or a gesture of the object person by way of comparing the detected results with posture data or gesture data indicating postures or gestures corresponding to "the relative position between the face position and the fingertip position" and "the changes of the fingertip position relative to the face position".

According to another aspect of the present invention, the predetermined method is to calculate a feature vector from an average and variance of a predetermined number of frames for an arm/hand position or a hand fingertip position, and the previously stored method is to calculate for all postures or gestures a probability density of posteriori distributions of each random variable based on the feature vector and by means of a statistical method so as to determine a posture or a gesture with a maximum probability density.

In this gesture recognition program, the face/fingertip position detection means detects a face position and a fingertip position of the object person in three-dimensional space based on contour information and human skin region information of the object person to be produced by the images captured. The posture/gesture recognition means then calculates, from the fingertip position and the face position, an average and variance of a predetermined number of frames (e.g. 5 frames) for the fingertip position relative to the face position as a "feature vector". Based on the obtained feature vector and by means of a statistical method, the posture/gesture recognition means calculates for all postures and gestures a probability density of posteriori distributions of each random variable, and determines a posture or a gesture with the maximum probability density for each frame, so that the posture or the gesture with the maximum probability density is recognized as the posture or the gesture in the corresponding frame.

Other features and advantages of the present invention will be apparent from the following description taken in connection with the accompanying drawings.

BRIEF DESCRIPTION OF THE DRAWINGS

Preferred embodiments of the present invention will be described below, by way of example only, with reference to the accompanying drawings, in which:

FIG. 3 shows images, in which (a) is a distance image D1, (b) is a difference image D2, (c) is an edge image D3, and (d) shows human skin regions R1, R2;

FIG. 4 shows figures explaining a manner of setting the object distance;

FIG. 5 shows figures explaining a manner of setting the object region T and a manner of extracting the contour O of the object person C within the object region T;

FIG. 7 shows figures, in which (a) is for explaining a detection method for the head top position m1, and (b) is for explaining a detection method for the face position m2;

FIG. 8 shows figures, in which (a) is for explaining a detection method for the arm/hand position m3, and (b) is for explaining a detection method for the hand fingertip position m4;

FIG. 9 shows posture data P1 to P6;

FIG. 10 shows gesture data J1 to J4;

FIG. 16 shows posture data P11 to P16;

FIG. 17 shows gesture data J11 to J14;

FIG. 19 shows figures, in which (a) explains a manner of setting a determination circle E, (b) explains an instance where the area Sh of the human skin region R2 is greater than a half of the area S of the determination circle E, and (c) explains an instance where the area Sh of the human skin region R2 is equal to or smaller than a half of the area S of the determination circle E;

INCORPORATION BY REFERENCE

Figure 1:
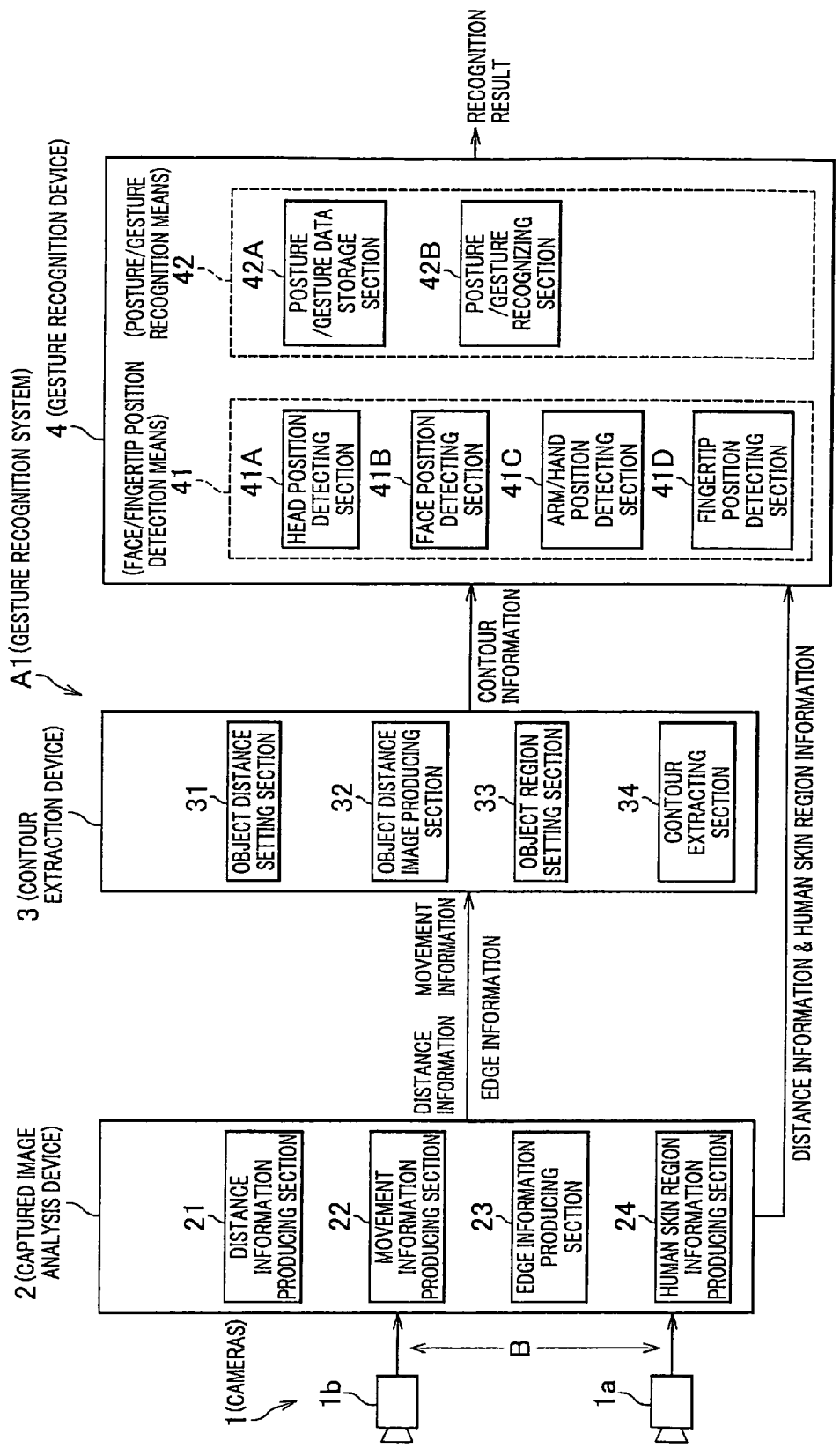
FIG. 1 is a block diagram illustrating the whole arrangement of a gesture recognition system A1.

The following references are hereby incorporated by reference into the detailed description of the invention, and also as disclosing alternative embodiments of elements or features of the preferred embodiment not otherwise set forth in detail above or below or in the drawings. A single one or a combination of two or more of these references may be consulted to obtain a variation of the preferred embodiment.

Japanese Patent Application No.2003-096271 filed on Mar. 31, 2003.

Japanese Patent Application No.2003-096520 filed on Mar. 31, 2003.

DETAILED DESCRIPTION OF THE INVENTION

With reference to the accompanying drawings, a first embodiment and a second embodiment of a gesture recognition system according to the present invention will be described.

First Embodiment

The arrangement of a gesture recognition system A1 including a gesture recognition device 4 will be described with reference to FIGS. 1 to 19, and thereafter the operation of the gesture recognition system A1 will be described with reference to FIGS. 20 and 21.

Arrangement of Gesture Recognition System A1

With reference to FIG. 1, the whole arrangement of the gesture recognition system A1 including the gesture recognition device 4 will be described.

As shown in FIG. 1, the gesture recognition system A1 includes two cameras 1 (1a, 1b) for capturing an object person (not shown) a captured image analysis device 2 for producing various information by analyzing images (captured images) captured by the cameras 1, a contour extraction device 3 for extracting a contour of the object person based on the information produced by the captured image analysis device 2, and a gesture recognition device 4 for recognizing a posture or a gesture of the object person based on the information produced by the captured image analysis device 2 and the contour of the object person (contour information) extracted by the contour extraction device 3. Description will be given below for the cameras 1, the captured image analysis device 2, the contour extraction device 3, and the gesture recognition device 4.

Cameras 1

Cameras 1a, 1b are color CCD cameras. The right camera 1a and the left camera 1b are positioned spaced apart for the distance B. In this preferred embodiment, the right camera 1a is a reference camera. Images (captured images) taken by cameras 1a, 1b are stored in a frame grabber (not shown) separately for the respective frames, and then they are inputted to the captured image analysis device 2 in a synchronized manner.

Images (captured images) taken by the cameras 1a, 1b are subject to a calibration process and a rectification process at a compensator (not shown), and they are inputted to the captured image analysis device 2 after the image correction.

Captured Image Analysis Device 2

The captured image analysis device 2 analyzes the images (captured images) inputted from the cameras 1a, 1b, and produces distance information, movement information, edge information, and human skin region information (FIG. 1).

Figure 2:
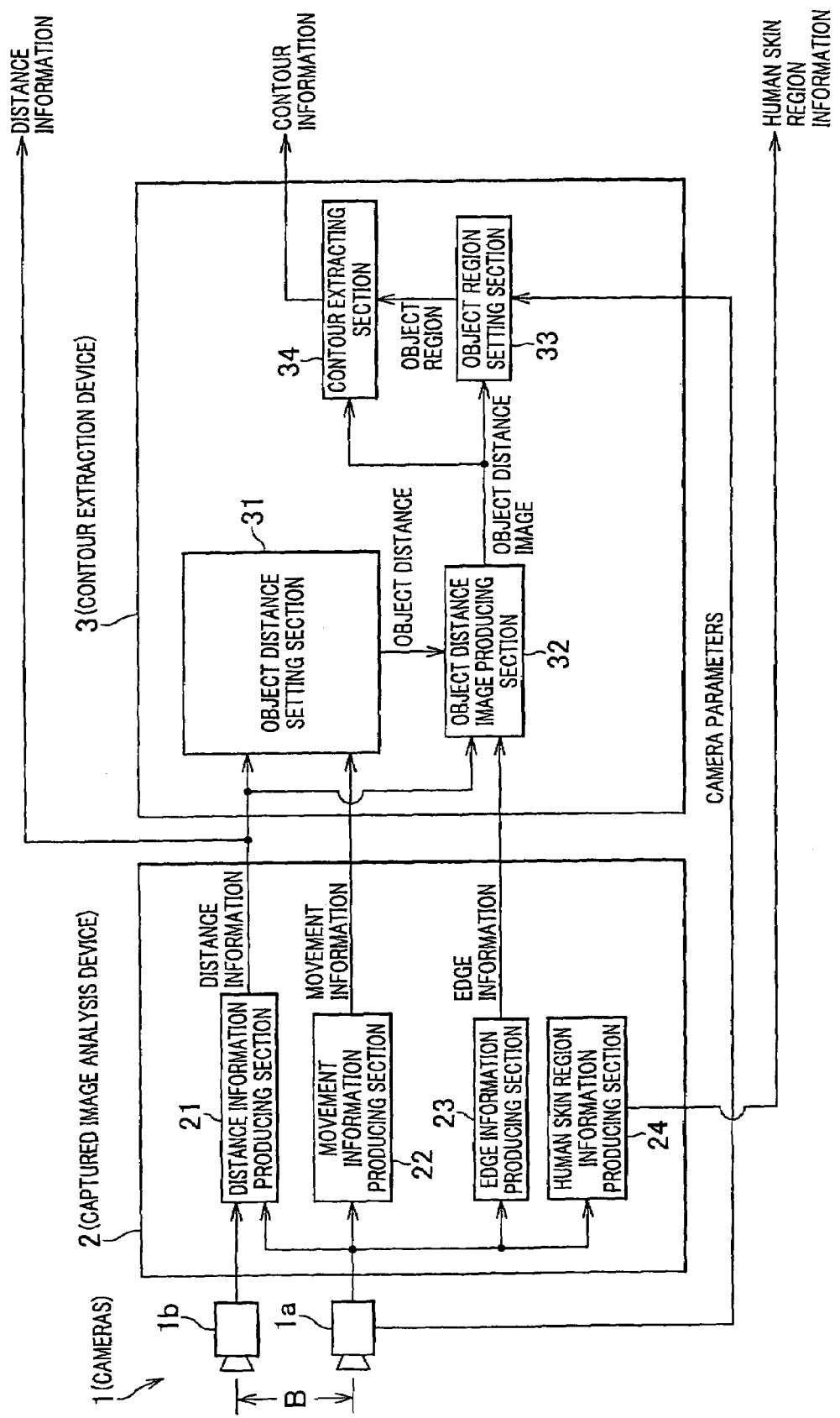
FIG. 2 is a block diagram illustrating the arrangements of a captured image analysis device 2 and a contour extraction device 3 included in the gesture recognition system A1 of FIG. 1.

As shown in FIG. 2, the captured image analysis device 2 includes a distance information producing section 21 for producing the distance information, a movement information producing section 22 for producing the movement information, an edge information producing section 23 for producing the edge information, and a human skin region information producing section 24 for producing the human skin region information.

Distance Information Producing Section 21

The distance information producing section 21 detects for each pixel a distance from the cameras 1 (the focus point of the cameras 1) based on a parallax between the two captured images simultaneously taken (captured) by the cameras 1a, 1b. To be more specific, the parallax is obtained by the block correlational method using a first captured image taken by the camera 1a as the reference camera and a second captured image taken by the camera 1b. The distance from the cameras 1 to the object captured by each pixel is then obtained by the parallax and by means of trigonometry. The distance image D1 (FIG. 3(a)) which indicates distance by a pixel amount is produced by associating the obtained distance with each pixel of the first captured image. The distance image D1 becomes the distance information. In the instance shown in FIG. 3(a), the object person C exists in the same distance from the cameras 1a, 1b.

The block correlational method compares the same block with a certain size (e.g. 8×3 pixels) between the first captured image and the second captured image, and detects how many pixels the object in the block is away from each other between the first and second captured images to obtain the parallax.

Movement Information Producing Section 22

The movement information producing section 22 detects the movement of the object person based on the difference between the captured image (t) at time t and the captured image (t+Δt) at time t+Δt, which are taken by the camera (reference camera) 1a in time series order. To be more specific, the difference is obtained between the captured image (t) and the captured image (t+Δt), and the displacement of each pixel is referred to. The displacement vector is then obtained based on the displacement referred to, so as to produce a difference image D2 (FIG. 3(b)) which indicates the obtained displacement vector by pixel amount. The difference image D2 becomes the movement information. In the instance shown in FIG. 3(b), movement can be detected at the left arm of the object person C.

Edge Information Producing Section 23

The edge information producing section 23 produces, based on gradation information or color information for each pixel in an image (captured image) taken by the camera (reference camera) 1a, an edge image by extracting edges existing in the captured image. To be more specific, based on the brightness or luminance of each pixel in the captured image, a part where the brightness changes to a greater extent is detected as an edge, and the edge image D3 (FIG. 3(c)) only made up of the edges is produced. The edge image D3 becomes the edge information.

Detection of edges can be performed by multiplying each pixel by, for example, Sobel operator, and in terms of row or column a segment having a certain difference to the next segment is detected as an edge (transverse edge or longitudinal edge). Sobel operator is a coefficient matrix having a weighting coefficient relative to a pixel in a proximity region of a certain pixel.

Human Skin Region Information Producing Section 24

The human skin region information producing section 24 extracts a human skin region of the object person existing in the captured image from the images (captured images) taken by the camera (reference camera) 1a. To be more specific, RGB values of all pixels in the captured image are converted into HLS space of hue, lightness, and saturation. Pixels, of which hue, lightness, and saturation are in a predetermined range of threshold values, are then extracted as human skin regions (FIG. 3(d)). In the instance shown in FIG. 3(d), the face of the object person C is extracted as a human skin region R1 and the hand of the object person C is extracted as a human skin region R2. The human skin regions R1, R2 become the human skin region information.

The distance information (distance image D1), the movement information (difference image D2), and the edge information (edge image D3) produced by the captured image analysis device 2 are inputted into the contour extraction device 3. The distance information (distance image D1) and the human skin region information (human skin regions R1, R2) produced by the captured image analysis device 2 are inputted into the gesture recognition device 4.

Contour Extraction Device 3

The contour extraction device 3 extracts a contour of the object person (FIG. 1) based on the distance information (distance image D1), the movement information (difference image D2), and the edge information (edge image D3) produced by the captured image analysis device 2.

As shown in FIG. 2, the contour extraction device 3 includes an object distance setting section 31 for setting an object distance where the object person exists, an object distance image producing section 32 for producing an object distance image on the basis of the object distance, an object region setting section 33 for setting an object region within the object distance image, and a contour extracting section 34 for extracting a contour of the object person.

Object Distance Setting Section 31

The object distance setting section 31 sets an object distance that is the distance where the object person exists, based on the distance image D1 (FIG. 3(a)) and the difference image D2 (FIG. 3(b)) produced by the captured image analysis device 2. To be more specific, pixels with the same pixel amount (same distance) are referred to as a group (pixel group) in the distance image D1, and with reference to the difference image D2 and to the corresponding pixel group, the total of the number of pixels with the same pixel amount is counted for each pixel group. It is determined that the moving object with the largest movement amount, that is, the object person exists in a region where the total amount of pixels for a specific pixel group is greater than a predetermined value and the distance thereof is the closest to the cameras 1, and such a distance is determined as the object distance (FIG. 4(a)). In the instance shown in FIG. 4(a), the object distance is set for 2.2 m. The object distance set by the object distance setting section 31 is inputted to the object distance image producing section 32.

Object Distance Image Producing Section 32

The object distance image producing section 32 refers to the distance image D1 (FIG. 3(a)) produced by the captured image analysis device 2, and extracts pixels, which corresponds to the pixels existing in the object distance+α m set by the object distance setting section 31, from the edge image D3 (FIG. 3(c)) to produce an object distance image. To be more specific, in the distance image D1, pixels corresponding to the object distance±α m that is inputted by the object distance setting section 31 are obtained. Only the obtained pixels are extracted from the edge image D3 produced by the edge information producing section 23, and the object distance image D4 (FIG. 4(b)) is produced. Therefore, the object distance image D4 represents an image which expresses the object person existing in the object distance by means of edge. The object distance image D4 produced by the object distance image producing section 32 is inputted to the object region setting section 33 and the contour extracting section 34.

Object Region Setting Section 33

The object region setting section 33 sets an object region within the object distance image D4 (FIG. 4(b)) produced by the object distance image producing section 32. To be more specific, histogram H is produced by totaling the pixels of the object distance image D4 in the longitudinal (vertical) direction, and the position where the frequency in the histogram H takes the maximum is specified as the center position of the object person C in the horizontal direction (FIG. 5(a)). Region extending in the right and left of the specified center position with a predetermined size (e.g. 0.5 m from the center) is set as an object region T (FIG. 5(b)). The range of the object region T in the vertical direction is set for a predetermined size (e.g. 2 m). Upon setting the object region T, the setting range of the object region T is corrected referring to camera parameters, such as tilt angle or height of the cameras 1. The object region T set by the object region setting section 33 is inputted to the contour extracting section 34.

Contour Extracting Section 34

In the object distance image D4 (FIG. 4(b)) produced by the object distance image producing section 32, the contour extracting section 34 extracts a contour O of the object person C from the object region T set by the object region setting section 33 (FIG. 5(c)). To be more specific, upon extracting the contour O of the object person C, so-called "SNAKES" method is applied. SNAKES method is a method using an active contour model consisting of a closed curve that is called "Snakes". SNAKES method reduces or deforms Snakes as an active contour model so as to minimize a predefined energy, and extracts the contour of the object person. As shown in FIG. 1, the contour O of the object person C extracted by the contour extracting section 34 is inputted to the gesture recognition device 4 as contour information.

Gesture Recognition Device 4

The gesture recognition device 4 recognizes, based on the distance information and the human skin region information produced by the captured image analysis device 2 and the contour information produced by the contour extraction device 3, postures or gestures of the object person, and outputs the recognition results (see FIG. 1).

Figure 6:
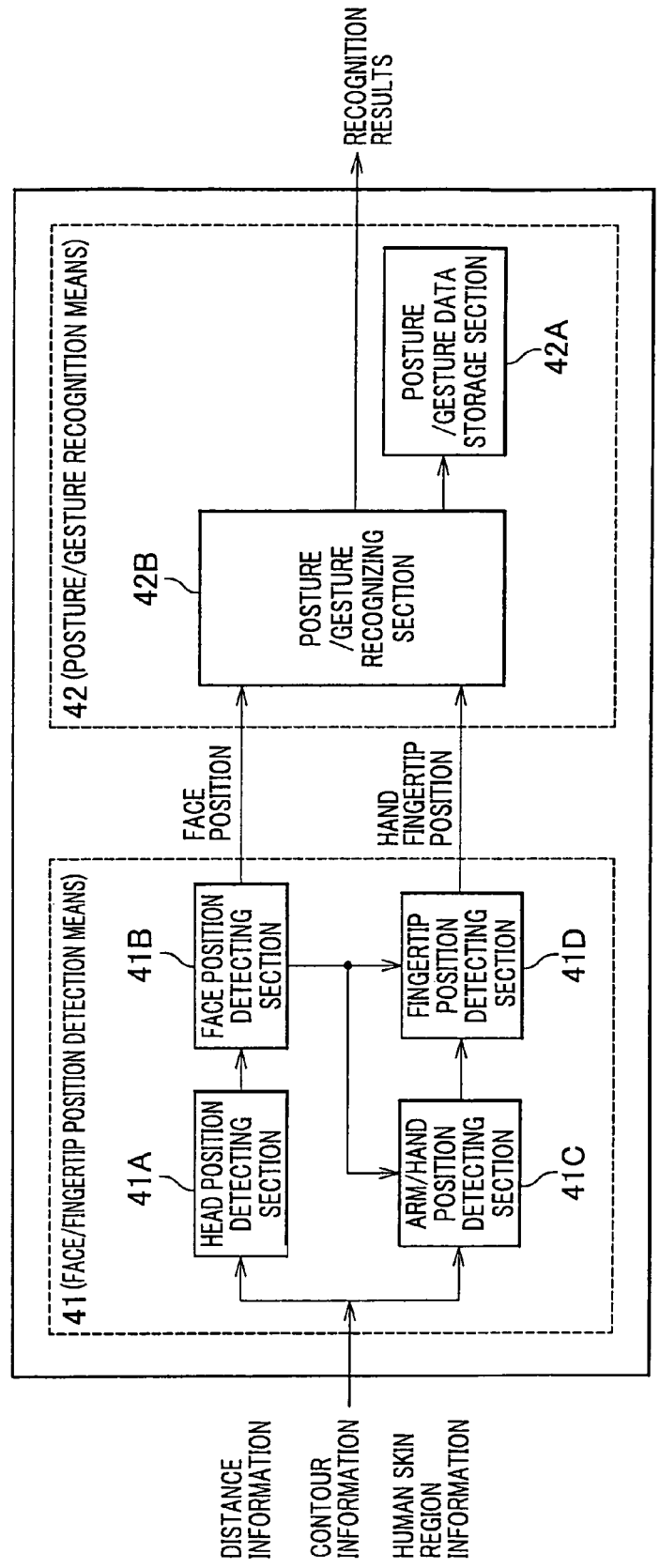
FIG. 6 is a block diagram illustrating the arrangement of a gesture recognition device 4 included in the gesture recognition system A1 of FIG. 1.

As shown in FIG. 6, the gesture recognition device 4 includes a face/fingertip position detection means 41 for detecting the face position and the hand fingertip position of the object person C in three-dimensional space (real space), and a posture/gesture recognition means 42 for recognizing a posture or a gesture of the object person based on the face position and the hand fingertip position detected by the face/fingertip position detection means 41.

Face/Fingertip Position Detection Means 41

The face/fingertip position detection means 41 includes a head position detecting section 41A for detecting a head top position of the object person in three-dimensional space, a face position detecting section 41B for detecting a face position of the object person, an arm/hand position detecting section 41C for detecting an arm/hand position of the object person, and a fingertip position detecting section 41D for detecting a hand fingertip position of the object person. Herein, the term "arm/hand" indicates a part including arm and hand, and the term "hand fingertip" indicates fingertips of hand.

Head Position Detecting Section 41A

The head position detecting section 41A detects the "head top position" of the object person C based on the contour information produced by the contour extraction device 3. Manner of detecting the head top position will be described with reference to FIG. 7(a). As shown in FIG. 7(a), the center of gravity G is obtained in the region surrounded by the contour O (1). Next, the region (head top position search region) F1 for searching the head top position is set (2). The horizontal width (width in X-axis) of the head top position search region F1 is determined such that a predetermined length corresponding to the average human shoulder length W extends from the X-coordinate of the center of gravity G. The average human shoulder length W is set by referring to the distance information produced by the captured image analysis device 2. The vertical width (width in Y-axis) of the head top position search region F1 is determined to have a width sufficient for covering the contour O. The uppermost point of the contour 0 within the head top position search region F1 is determined as the head top position m1 (3). The head top position m1 detected by the head position detecting section 41A is inputted to the face position detecting section 41B.

Face Position Detecting Section 41B

The face position detecting section 41B detects the "face position" of the object person C based on the head top position m1 detected by the head position detecting section 41A and the human skin region information produced by the captured image analysis device 2. Manner of detecting the face position will be described with reference to FIG. 7(b). As shown in FIG. 7(b), the region (face position search region) F2 for searching the face position is set (4). The range of the face position search region F2 is determined such that a predetermined size for mostly covering the head of a human extends in consideration of the head top position m1. The range of the face position search region F2 is set by referring to the distance information produced by the captured image analysis device 2.

Next, in the face position search region F2, the center of gravity of the human skin region R1 is determined as the face position m2 on the image (5). As to the human skin region R1, the human skin region information produced by the captured image analysis device 2 is referred to. From the face position m2 (Xf, Yf) on the image and with reference to the distance information produced by the captured image analysis device 2, the face position m2t (Xft, Yft, Zft) in three-dimensional space is obtained.

"The face position m2 on the image" detected by the face position detecting section 41B is inputted to the arm/hand position detecting section 41C and the fingertip position detecting section 41D. "The face position m2t in three-dimensional space" detected by the face position detecting section 41B is stored in a storage means (not shown) such that the posture/gesture recognizing section 42B of the posture/gesture recognition means 42 (FIG. 6) recognizes a posture or a gesture of the object person C.

Arm/Hand Position Detecting Section 41C

The arm/hand position detecting section 41C detects the arm/hand position of the object person C based on the human skin region information produced by the captured image analysis device 2 and the contour information produced by the contour extraction device 3. The human skin region information concerns information of the region excluding the periphery of the face position m2. Manner of detecting the arm/hand position will be described with reference to FIG. 8(a). As shown in FIG. 8(a), the region (arm/hand position search region) F3 (F3R, F3L) for searching the arm/hand position is set (6). The arm/hand position search region F3 is determined such that a predetermined range is set for covering ranges where right and left arms/hands reach in consideration of the face position m2 detected by the face position detecting section 41B. The size of the arm/hand position search region F3 is set by referring to the distance information produced by the captured image analysis device 2.

Next, the center of gravity of the human skin region R2 in the arm/hand position search region F3 is determined as the arm/hand position m3 on the image (7). As to the human skin region R2, the human skin region information produced by the captured image analysis device 2 is referred to. The human skin region information concerns information of the region excluding the periphery of the face position m2. In the example shown in FIG. 8(a), because the human skin region exists only in the arm/hand position search region F3 (L), the arm/hand position m3 can be detected only in the arm/hand position search region F3(L). Also in the example shown in FIG. 8(a), because the object person puts on a long-sleeved wear exposing a part from the wrist, the hand position becomes the arm/hand position m3. The "arm/hand position m3 on the image" detected by the arm/hand position detecting section 41C is inputted to the fingertip position detecting section 41D.

Fingertip Position Detecting Section 41D

The fingertip position detecting section 41D detects the hand fingertip position of the object person C based on the face position m2 detected by the face position detecting section 41B and the arm/hand position m3 detected by the arm/hand position detecting section 41C. Manner of detecting the hand fingertip position will be described with reference to FIG. 8(b). As shown in FIG. 8(b), the region (hand fingertip position search region) F4 for searching the hand fingertip position is set within the arm/hand position search region F3L (8). The hand fingertip position search region F4 is determined such that a predetermined range is set for mostly covering the hand of the object person in consideration of the arm/hand position m3. The size of the hand fingertip position search region F4 is set by referring to the distance information produced by the captured image analysis device 2.

Next, end points m4a to m4d for top, bottom, right, and left of the human skin region R2 are detected within the hand fingertip position search region F4 (9). As to the human skin region R2, the human skin region information produced by the captured image analysis device 2 is referred to. By comparing the vertical direction distance d1 between the top and bottom end points (m4a, m4b) and the horizontal direction distance d2 between the right and left end points (m4c, m4d), the one with the longer distance is determined as the direction where the arm/hand of the object person extends (10). In the example shown in FIG. 8(b), because the vertical direction distance d1 is longer than the horizontal direction distance d2, it is determined that the hand fingertips extend in the top and bottom direction.

Next, based on the positional relation between the face position m2 on the image and the arm/hand position m3 on the image, a determination is made as to which one of the top end point m4a and the bottom end point m4b (the right end point m4c and the left end point m4d) is the arm/hand position. To be more specific, if the arm/hand position m3 is far away from the face position m2, it is considered that the object person extends his arm, so that the end point that is farther away from the face position m2 is determined as the hand fingertip position (hand fingertip position on the image) m4. On the contrary, if the arm/hand position m3 is close to the face position m2, it is considered that the object person folds his elbow, so that the end point that is closer to the face position m2 is determined as the hand fingertip position m4. In the example shown in FIG. 8(b), because the arm/hand position m3 is far away from the face position m2 and the top end point m4a is farther away from the face position m2 than the bottom end point m4b is, it is determined that the top end point m4a is the hand fingertip position m4 (11).

Next, from the hand fingertip position m4 (Xh, Yh) on the image and with reference to the distance information produced by the captured image analysis device 2, the hand fingertip position M4t (Xht, Yht, Zht) in three-dimensional space is obtained. The "hand fingertip position m4t in three-dimensional space" detected by the fingertip position detecting section 41D is stored in a storage means (not shown) such that the posture/gesture recognizing section 42B of the posture/gesture recognition means 42 (FIG. 6) recognizes a posture or a gesture of the object person C.

Posture/Gesture Recognition Means 42

The posture/gesture recognition means 42 includes a posture/gesture data storage section 42A for storing posture data and gesture data, and a posture/gesture recognizing section 42B for recognizing a posture or a gesture of the object person based on "the face position m2t in three-dimensional space" and "the hand fingertip position m4t in three-dimensional space" detected by the face/fingertip position detection means 41 (see FIG. 6).

Posture/Gesture Data Storage Section 42A

The posture/gesture data storage section 42A stores posture data P1-P6 (FIG. 9) and gesture data J1-J4 (FIG. 10). The posture data P1-P6 and the gesture data J1-J4 are data indicating postures or gestures corresponding to "the relative position between the face position and the hand fingertip position in three-dimensional space" and "changes of the hand fingertip position relative to the face position". "The relative position between the face position and the hand fingertip position" is specifically indicates "heights of the face position and the hand fingertip position" and "distances of the face position and the hand fingertip position from the cameras 1". The posture/gesture recognition means 42 can also detect "the relative position between the face position and the hand fingertip position" from "the horizontal deviation of the face position and the hand fingertip position on the image". The posture data P1-P6 and the gesture data J1-J4 are used when the posture/gesture recognizing section 42B recognizes a posture or a gesture of the object person.

As shown in FIG. 9, the posture data P1-P6 will be described. In FIG. 9, (a) shows "FACE SIDE" (Posture P1) indicating "hello", (b) shows "HIGH HAND" (Posture P2) indicating "start following", (c) shows "STOP" (Posture P3) indicating "stop", (d) shows "HANDSHAKE" (Posture P4) indicating "handshaking", (e) shows "SIDE HAND" (Posture P5) indicating "look at the hand direction", and (f) shows "LOW HAND" (Posture P6) indicating "turn to the hand direction".

As shown in FIG. 10, the gesture J1-J4 will be described. In FIG. 10, (a) shows "HAND SWING" (Gesture J1) indicating "be careful", (b) shows "BYE BYE" (Gesture J2) indicating "bye-bye", (c) shows "COME HERE" (Gesture J3) indicating "come here", and (d) shows "HAND CIRCLING" (Gesture J4) indicating "turn around".

In this preferred embodiment, the posture/gesture data storage section 42A (FIG. 6) stores the posture data P1-P6 (FIG. 9) and the gesture data J1-J4 (FIG. 10). However, the posture data and the gesture data stored in the posture/gesture data storage section 42A can be set arbitrarily. The meaning of each posture and gesture can also be set arbitrarily.

Posture/Gesture Recognizing Section 42B

The posture/gesture recognizing section 42B detects "the relative relation between the face position m2t and the hand fingertip position m4t" and "the changes of the hand fingertip position m4t relative to the face position m2" from "the face position m2t in three-dimensional space" and "the hand fingertip position m4t in three-dimensional space" detected by the face/fingertip position detection means 41, and compares the detected results with the posture data P1-P6 (FIG. 9) or the gesture data J1-J4 (FIG. 10) stored in the posture/gesture data storage section 42A, so as to recognize a posture or gesture of the object person. The recognition results at the posture/gesture recognizing section 42B are stored as history.

With reference to the flow charts shown in FIGS. 11 to 14, the posture/gesture recognition method at the posture/gesture recognizing section 42B will be described in detail. The outline of the process at the posture/gesture recognizing section 42B will be described firstly with reference to the flow chart shown in FIG. 11, and the posture recognition process (step S1) shown in the flow chart of FIG. 11 will be described with reference to the flow chart of FIG. 12, and then the posture/gesture recognition process (step S4) shown in the flow chart of FIG. 11 will be described with reference to the flow charts of FIGS. 13 and 14.

Outline of Process at Posture/Gesture Recognizing Section 42B

Figure 11:
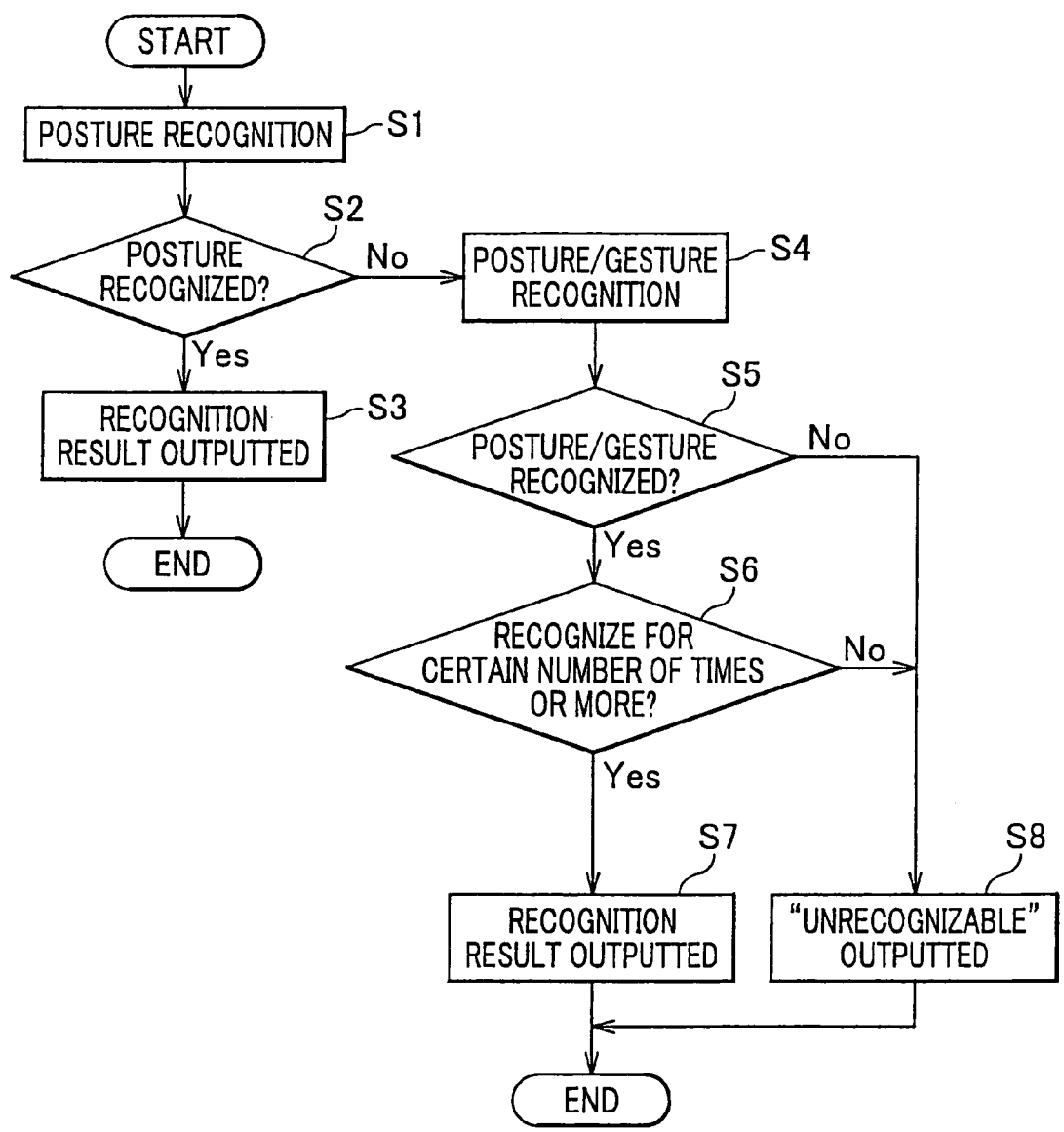
FIG. 11 is a flow chart explaining the outline of the process at the posture/gesture recognizing section 42B.

As seen in the flow chart of FIG. 11, postures P1 to P4 (FIG. 9) are recognized in step S1. Next, in step S2, a determination is made as to whether a posture was recognized in step S1. If it is determined that a posture was recognized, operation proceeds to step S3. If it is not determined that a posture was recognized, then operation proceeds to step S4. In step S3, the posture recognized in step S1 is outputted as a recognition result and the process is completed.

In step S4, postures P5, P6 (FIG. 9) or gestures J1-J4 (FIG. 10) are recognized. Next, in step S5, a determination is made as to whether a posture or a gesture is recognized in step S4. If it is determined that a posture or a gesture was recognized, operation proceeds to step S6. If it is not determined that a posture or a gesture was recognized, then operation proceeds to step S8.

In step S6, a determination is made as to whether the same posture or gesture is recognized for a certain number of times (e.g. 5 times) or more in a predetermined past frames (e.g. 10 frames). If it is determined that the same posture or gesture was recognized for a certain number of times or more, operation proceeds to step S7. If it is not determined that the same posture or gesture was recognized for a certain number of times or more, then operation proceeds to step S8.

In step S7, the posture or gesture recognized in step S4 is outputted as a recognition result and the process is completed. Also, in step S8, "unrecognizable" is outputted indicating that a posture or a gesture was not recognized, and the process is completed.

Step S1: Posture Recognition Process

Figure 12:
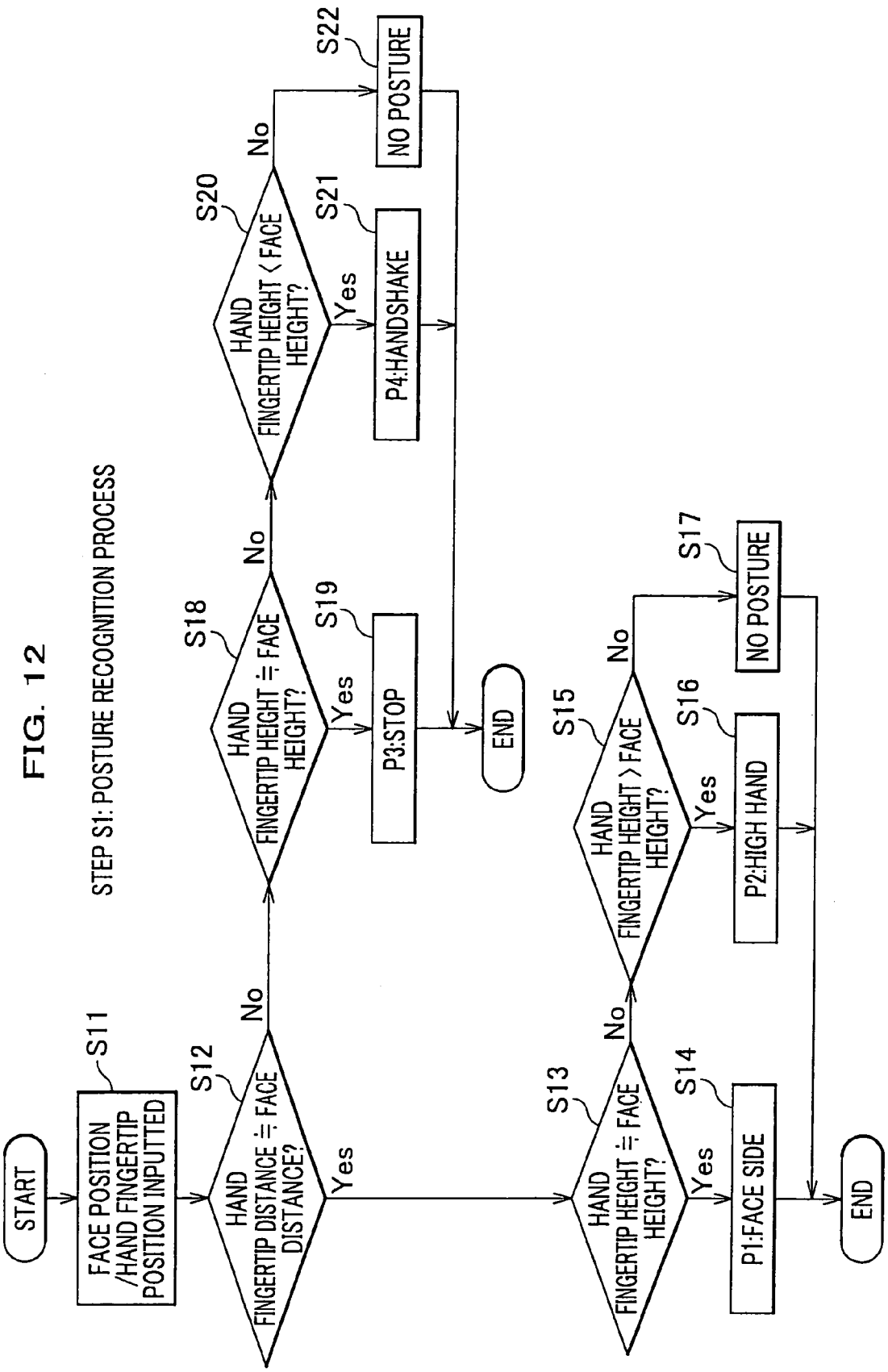
FIG. 12 is a flow chart explaining the posture recognition process (step S1) shown in the flow chart of FIG. 11.

As seen in the flow chart of FIG. 12, in step S11, the face/fingertip position detection means 41 inputs the face position m2t and the hand fingertip position m4t of the object person in three-dimensional space (hereinafter referred to as "inputted information"). In the next step S12, based on the face position m2t and the hand fingertip position m4t, a comparison is made between the distance from the cameras 1 to the hand fingertip (hereinafter referred to as a "hand fingertip distance") and the distance from the cameras 1 to the face (hereinafter referred to as a "face distance"), to determine whether the hand fingertip distance and the face distance are almost same, that is, whether the difference between the hand fingertip distance and the face distance is equal to or less than a predetermined value. If it is determined that these distances are almost same, operation proceeds to step S13. If it is not determined that they are almost same, then operation proceeds to step S18.

In step S13, a comparison is made between the height of the hand fingertip (hereinafter referred to as a "hand fingertip height") and the height of the face (hereinafter referred to as a "face height"), to determine whether the hand fingertip height and the face height are almost same, that is, whether the difference between the hand fingertip height and the face height is equal to or less than a predetermined value. If it is determined that these heights are almost same, operation proceeds to step S14. If it is not determined that they are almost same, operation proceeds to step S15. In step S14, the recognition result is outputted such that the posture corresponding to the inputted information is FACE SIDE (Posture P1) (FIG. 9(a)), and the process is completed.

In step S15, a comparison is made between the hand fingertip height and the face height, to determine whether the hand fingertip height is higher than the face height. If it is determined that the hand fingertip height is higher than the face height, operation proceeds to step S16. If it is not determined that the hand fingertip position is higher than the face height, then operation proceeds to step S17. In step S16, the recognition result is outputted such that the posture corresponding to the inputted information is HIGH HAND (Posture P2) (FIG. 9(b)), and the process is completed. In step S17, the recognition result is outputted such that no posture corresponds to the inputted information, and the process is completed.

In step S18, a comparison is made between the hand fingertip height and the face height, to determine whether the hand fingertip height and the face height are almost same, that is, whether the difference between the hand fingertip height and the face height is equal to or less than a predetermined value. If it is determined that these heights are almost same, operation proceeds to step S19. If it is not determined that they are almost same, then operation proceeds to step S20. In step S19, the recognition result is outputted such that the posture corresponding to the inputted information is STOP (Posture P3) (FIG. 9(c)), and the process is completed.

In step S20, a comparison is made between the hand fingertip height and the face height, to determine whether the hand fingertip height is lower than the face height. If it is determined that the hand fingertip height is lower than the face height, operation proceeds to step S21. If it is not determined that the hand fingertip height is lower than the face height, then operation proceeds to step S22. In step S21, the recognition result is outputted such that the posture corresponding to the inputted information is HANDSHAKE (Posture P4) (FIG. 9(d)), and the process is completed. In step S22, the recognition result is outputted such that no posture corresponds to the inputted information, and the process is completed.

Step S4: Posture/Gesture Recognition Process

Figure 13:
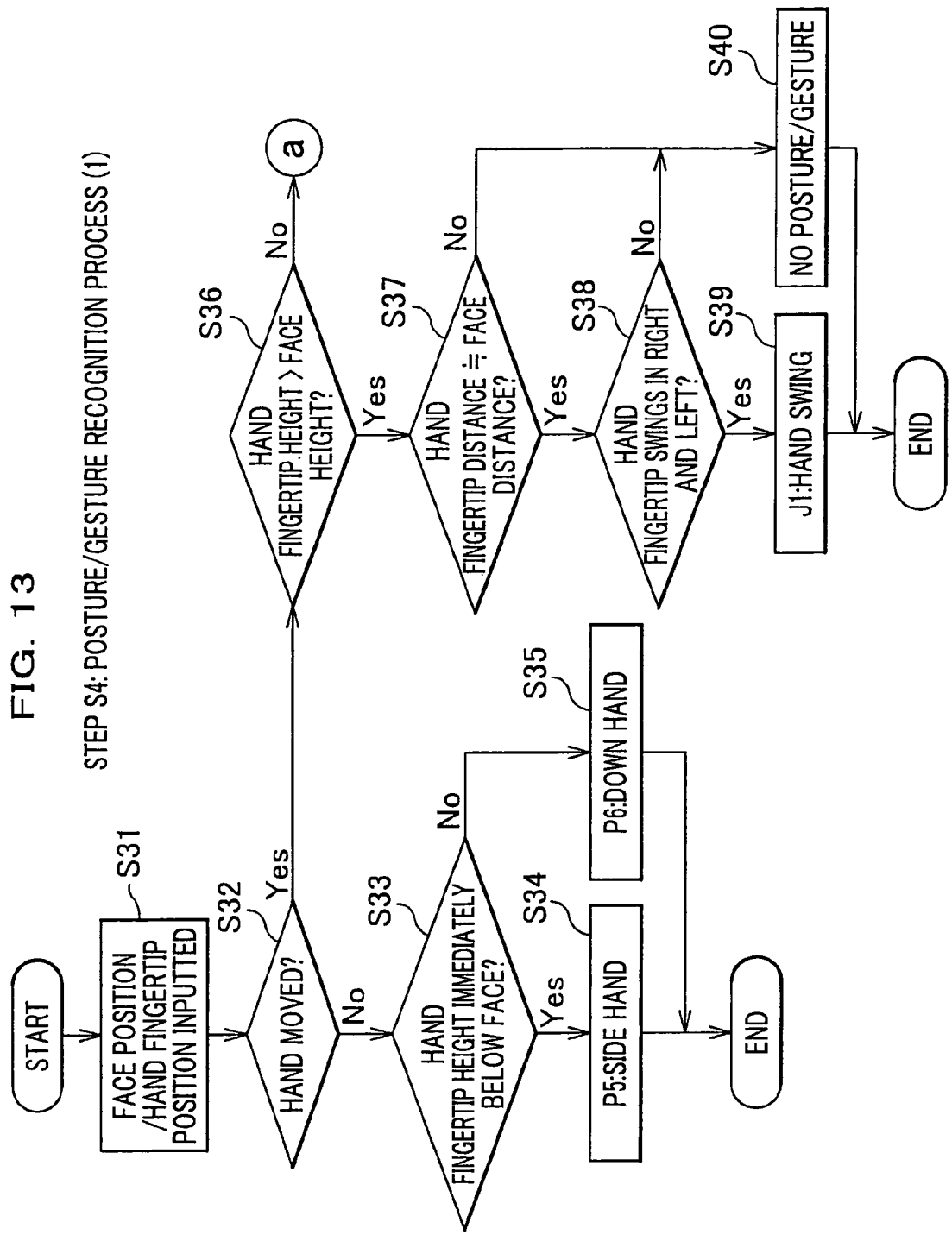
FIG. 13 is a first flow chart explaining the posture/gesture recognition process (step S4) shown in the flow chart of FIG. 11.

As seen in the flow chart of FIG. 13, the inputted information (the face position m2t and the hand fingertip position m4t of the object person in three-dimensional space) is inputted in step S31. Next, in step S32, the standard deviation of the hand fingertip position m4t based on the face position m2t is obtained, and a determination is made as to whether or not the movement of the hand occurs based on the obtained standard deviation. To be more specific, if the standard deviation of the hand fingertip position m4t is equal to or less than a predetermined value, it is determined that the movement of the hand does not occurs. If the standard deviation of the hand fingertip position is greater than the predetermined value, it is determined that the movement of the hand occurs. If it is determined that the movement of the hand does not occur, operation proceeds to step S33. If it is determined that the movement of the hand occurs, then operation proceeds to step S36.

In step S33, a determination is made as to whether the hand fingertip height is immediately below the face height. If it is determined that the hand fingertip height is immediately below the face height, operation proceeds to step S34. If it is not determined that the hand fingertip height is immediately below the face height, then operation proceeds to step S35. In step S34, the recognition result is outputted such that the posture or the gesture corresponding to the inputted information is SIDE HAND (Posture P5) (FIG. 9(e)), and the process is completed. In step S35, the recognition result is outputted such that the posture or the gesture corresponding to the inputted information is LOW HAND (Posture P6) (FIG. 9(f)), and the process is completed.

Figure 14:
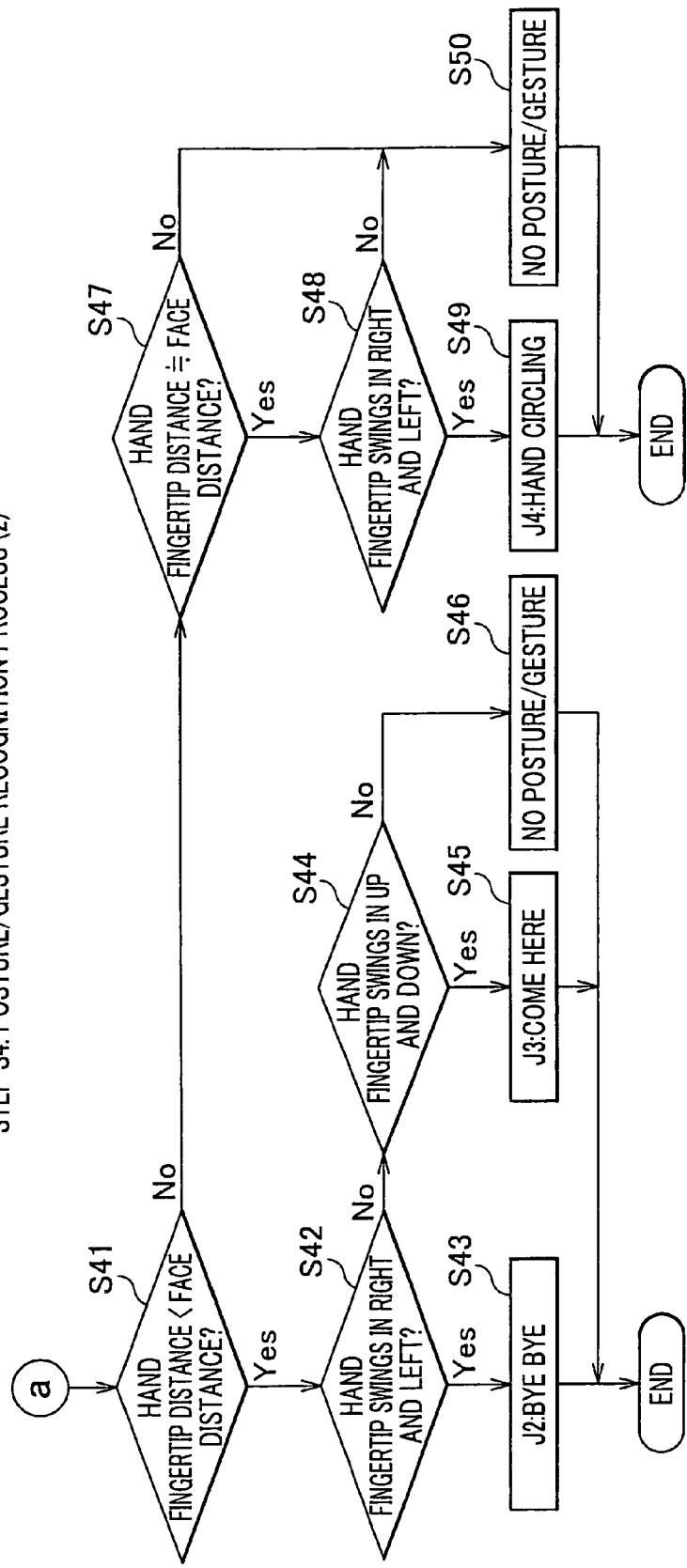
FIG. 14 is a second flow chart explaining the posture/gesture recognition process (step S4) shown in the flow chart of FIG. 11.

In step S36, a comparison is made between the hand fingertip height and the face height, to determine whether the hand fingertip height is higher than the face height. If it is determined that the hand fingertip height is higher than the face height, operation proceeds to step S37. If it is not determined that the hand fingertip height is higher than the face height, then operation proceeds to step S41 (FIG. 14). In step S37, a comparison is made between the hand fingertip distance and the face distance, to determine whether the hand fingertip distance and the face distance are almost same, that is, whether the difference between the hand fingertip distance and the face distance is equal to or less than a predetermined value. If it is determined that these distances are almost same, operation proceeds to step S38. If it is not determined that they are almost same, then operation proceeds to step S40.

In step S38, a determination is made as to whether the hand fingertip swings in right and left directions. Based on a shift in right and left directions between two frames, if it is determined that the hand fingertip swings in the right and left directions, operation proceeds to step S39. If it is not determined that the hand fingertip swings in the right and left directions, then operation proceeds to step S40. In step S39, the recognition result is outputted such that the posture or the gesture corresponding to the inputted information is HAND SWING (Gesture J1) (FIG. 10(a)), and the process is completed. In step S40, the recognition result is outputted such that no posture or gesture corresponds to the inputted information, and the process is completed.

As seen in the flow chart of FIG. 14, in step S41, a comparison is made between the hand fingertip distance and the face distance, to determine whether the hand fingertip distance is shorter than the face distance. If it is determined that the hand fingertip distance is shorter than the face distance, operation proceeds to step S42. If it is not determined that the hand fingertip distance is shorter than the face distance, then operation proceeds to step S47.

In step S42, a determination is made as to whether the hand fingertip swings in right and left directions. Based on a shift in right and left directions between two frames, if it is determined that the hand fingertip swings in the right and left directions, operation proceeds to step S43. If it is not determined that the hand fingertip swings in the right and left directions, then operation proceeds to step S44. In step S43, the recognition result is outputted such that the posture or the gesture corresponding to the inputted information is BYE BYE (Gesture J2) (FIG. 10(b)) and the process is completed.

In step S44, a determination is made as to whether the hand fingertip swings in up and down directions. Based on a shift in up and down directions between two frames, if it is determined that the hand fingertip swings in the up and down directions, operation proceeds to step S45. If it is not determined that the hand fingertip swings in the up and down directions, then operation proceeds to step S46. In step S45, the recognition result is outputted such that the posture or the gesture corresponding to the inputted information is COME HERE (Gesture J3) (FIG. 10(c)), and the process is completed. Instep S46, the recognition result is outputted such that no posture or gesture corresponds to the inputted information, and the process is completed.

In step S47, a comparison is made between the hand fingertip distance and the face distance, to determine whether the hand fingertip distance and the face distance are almost same, that is, whether the difference between the hand fingertip distance and the face distance is equal to or less than a predetermined value. If it is determined that these distances are almost same, operation proceeds to step S48. If it is not determined that they are almost same, then operation proceeds to step S50. In step S48, a determination is made as to whether the hand fingertip swings in right and left directions. If it is determined that the hand fingertip swings in the right and left directions, operation proceeds to step S49. If it is not determined that the hand fingertip swings in the right and left directions, then operation proceeds to step S50.

In step S49, the recognition result is outputted such that the posture or the gesture corresponding to the inputted information is HAND CIRCLING (Gesture J4) (FIG. 10(d)), and the process is completed. In step S50, the recognition result is outputted such that no posture or gesture corresponds to the inputted information, and the process is completed.

As described above, the posture/gesture recognizing section 42B detects "the relative position between the face position m2t and the hand fingertip position m4t" and "the changes of the hand fingertip position m4t relative to the face position m2t" from the inputted information (the face position m2t and the hand fingertip position m4t of the object person in three-dimensional space) inputted by the face/fingertip position detection means 41, and compares the detection results with the posture data P1-P6 (FIG. 9) and the gesture data J1-J4 (FIG.10) stored in the posture/gesture data storage section 42A, to thereby recognize postures or gestures of the object person.

Figure 15:
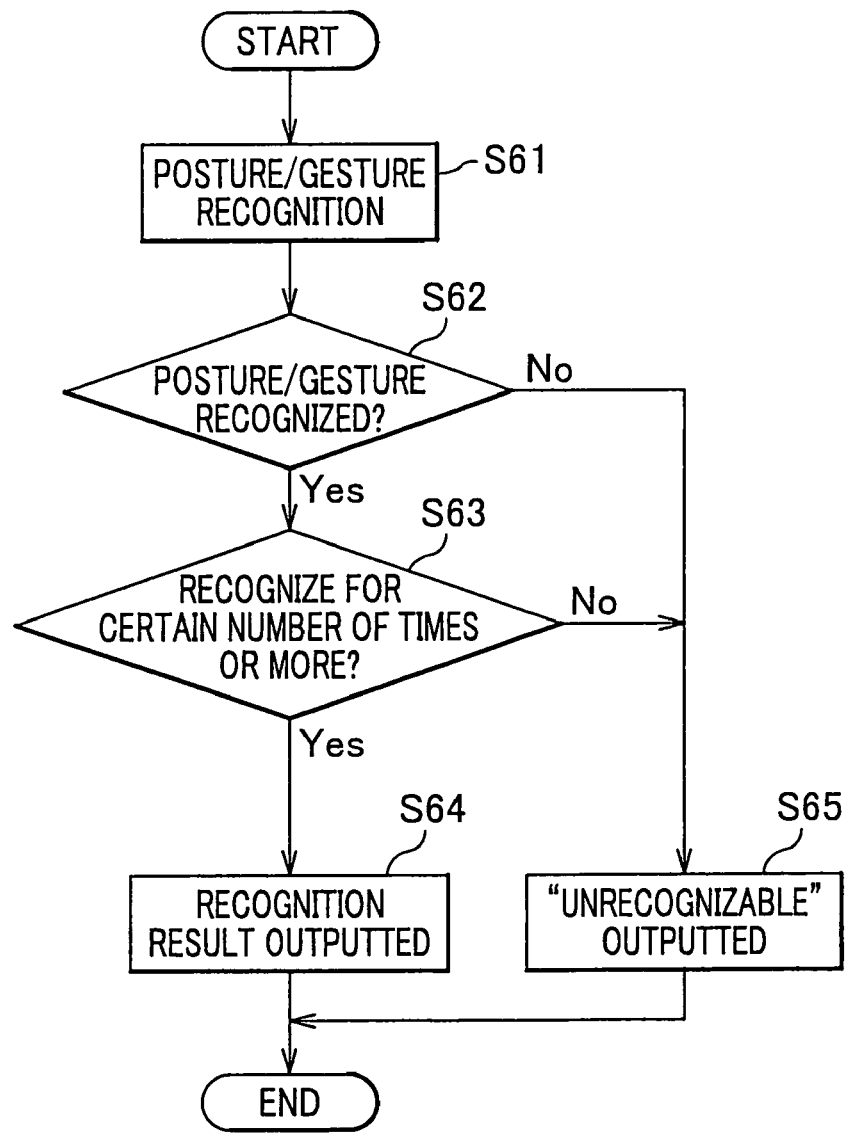
FIG. 15 is a flow chart explaining a first modification of the process at the posture/gesture recognizing section 42B.

Other than the above method, the posture/gesture recognizing section 42B can recognize postures or gestures of the object person by other methods, such as MODIFICATION 1 and MODIFICATION 2 below. With reference to FIGS. 15 to 17, "MODIFICATION 1" of the process at the posture/gesture recognizing section 42B will be described, and with reference to FIGS. 18 and 19, "MODIFICATION 2" of the process at the posture/gesture recognizing section 42B will be described.

Modification 1

In this modification 1, a pattern matching method is used for recognizing postures or gestures of the object person. As seen in the flow chart of FIG. 15, postures or gestures are recognized in step S61. To be more specific, the posture/gesture recognizing section 42B compares "the inputted pattern", which consists of the inputted information (the face position m2t and the hand fingertip position m4t of the object person in three-dimensional space) that is inputted by the face/fingertip position detection means 41 and "the changes of the hand fingertip position m4t relative to the face position m2t", with the posture data P11-P16 (FIG. 16) or the gesture data J11-J14 (FIG. 17) stored in the posture/gesture data storage section 42A, and finds out the most similar pattern to thereby recognize a posture or gesture of the object person. The posture/gesture data storage section 42A previously stores the posture data P11-P16 (FIG. 16) and the gesture data J11-J14 (FIG. 17) for pattern matching.

In the next step S62, a determination is made as to whether a posture or a gesture was recognized in step S61. If it is determined that a posture or a gesture was recognized, operation proceeds to step S63. If it is not determined that a posture or a gesture was recognized, then operation proceeds to step S65.

In step S63, a determination is made as to whether the same posture or gesture is recognized for a certain number of times (e.g. 5 times) or more in a predetermined past frames (e.g. 10 frames). If it is determined that the same posture or gesture was recognized for a certain number of times or more, operation proceeds to step S64. If it is not determined that the same posture or gesture was recognized for a certain number of times or more, then operation proceeds to step S65.

In step S64, the posture or the gesture recognized in step S61 is outputted as a recognition result and the process is completed. Also, in step S65, "unrecognizable" is outputted indicating that a posture or a gesture was not recognized, and the process is completed.

As described above, the posture/gesture recognizing section 42B can recognize postures or gestures of the object person by means of pattern matching, that is, by pattern matching the inputted pattern, which consists of the inputted information inputted by the face/fingertip position detection means 41 and "the changes of the hand fingertip position m4t relative to the face position m2t", with the posture data P11-P16 (FIG. 16) and the gesture data J11-J14 (FIG. 17) stored in the posture/gesture data storage section 42A.

Modification 2

In this modification 2, the posture/gesture recognizing section 42B sets a determination circle E with a sufficient size for the hand of the object person, and compares the area of the hand with the area of the determination circle E to distinguish "HANDSHAKE" (Posture P4) (FIG. 9(d)) and "COME HERE" (Gesture J3) (FIG. 10(c)), which are similar in relative position between the face position m2t and the hand fingertip position m4t . "HANDSHAKE" (Posture P4) and "COME HERE" (Gesture J3) are similar to each other and difficult to distinguish as they are common in that the height of the fingertip position is lower than the face position and that the distance of the fingertip position from the cameras is shorter than the distance of the face position from the cameras.

Figure 18:
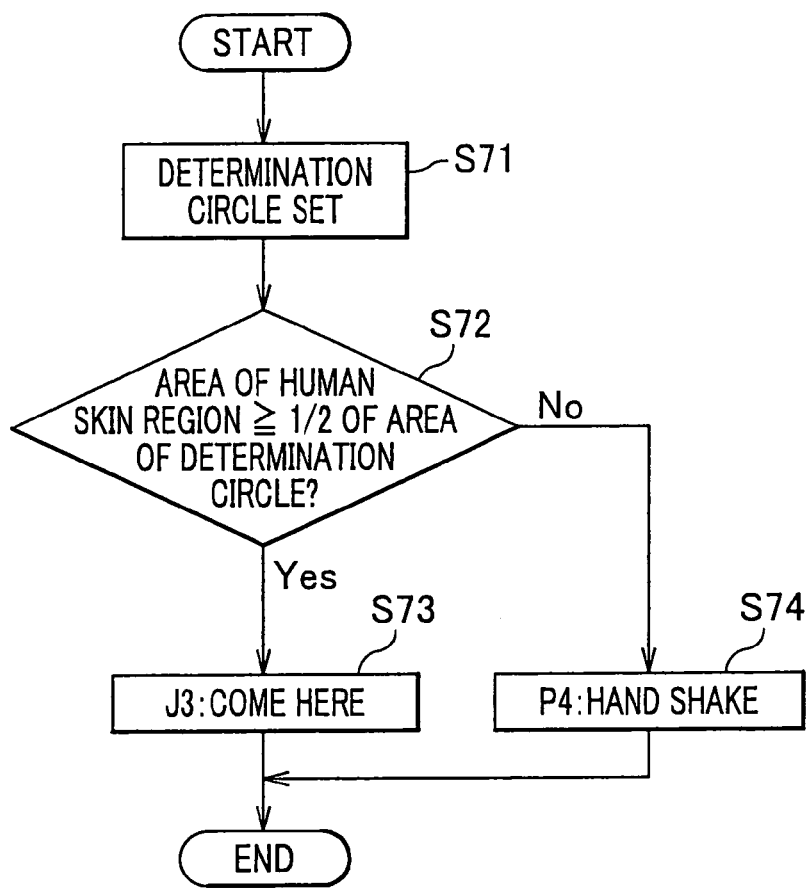
FIG. 18 is a flow chart explaining a second modification of the process at the posture/gesture recognizing section 42B.

As seen in the flow chart of FIG. 18, in step S71, a determination circle (determination region) E is set around the arm/hand position m3 (see FIG. 19). The size of the determination circle E is determined such that the determination circle E wholly covers the hand of the object person. The size (diameter) of the determination circle E is set with reference to the distance information produced by the captured image analysis device 2. In the example shown in FIG. 19, the determination circle E is set for a diameter of 20 cm.

In the next step S72, a determination is made as to whether the area Sh of the human skin region R2 within the determination circle E is equal to or greater than a half of the area S of the determination circle E. As to the human skin region R2, the human skin region information produced by the captured image analysis device 2 is referred to. If it is determined that the area Sh of the human skin region R2 is equal to or greater than a half of the area S of the determination circle E (FIG. 19(b)), operation proceeds to step S73. If it is determined that the area Sh of the human skin region R2 is smaller than a half of the area S of the determination circle E (FIG. 19(c)), then operation proceeds to step S74.

In step S73, the recognition result is outputted such that the posture or the gesture corresponding to the inputted information is COME HERE (Gesture J3) (FIG. 10(c)), and the process is completed. In step S73, the recognition result is outputted such that the posture or the gesture corresponding to the inputted information is HANDSHAKE (Posture P4) (FIG. 9(d)), and the process is completed.

As described above, the posture/gesture recognizing section 42B sets a determination circle E with a sufficient size for the hand of the object person, and compares the area Sh of the human skin region R2 within the determination circle E with the area of the determination circle E to distinguish "COME HERE" (Gesture J3) and "HANDSHAKE" (Posture P4).

Operation of Gesture Recognition System A1

Operation of the gesture recognition system A1 will be described with reference to the block diagram of FIG. 1 and the flow charts of FIGS. 20 and 21.

Captured Image Analysis Step

Figure 20:
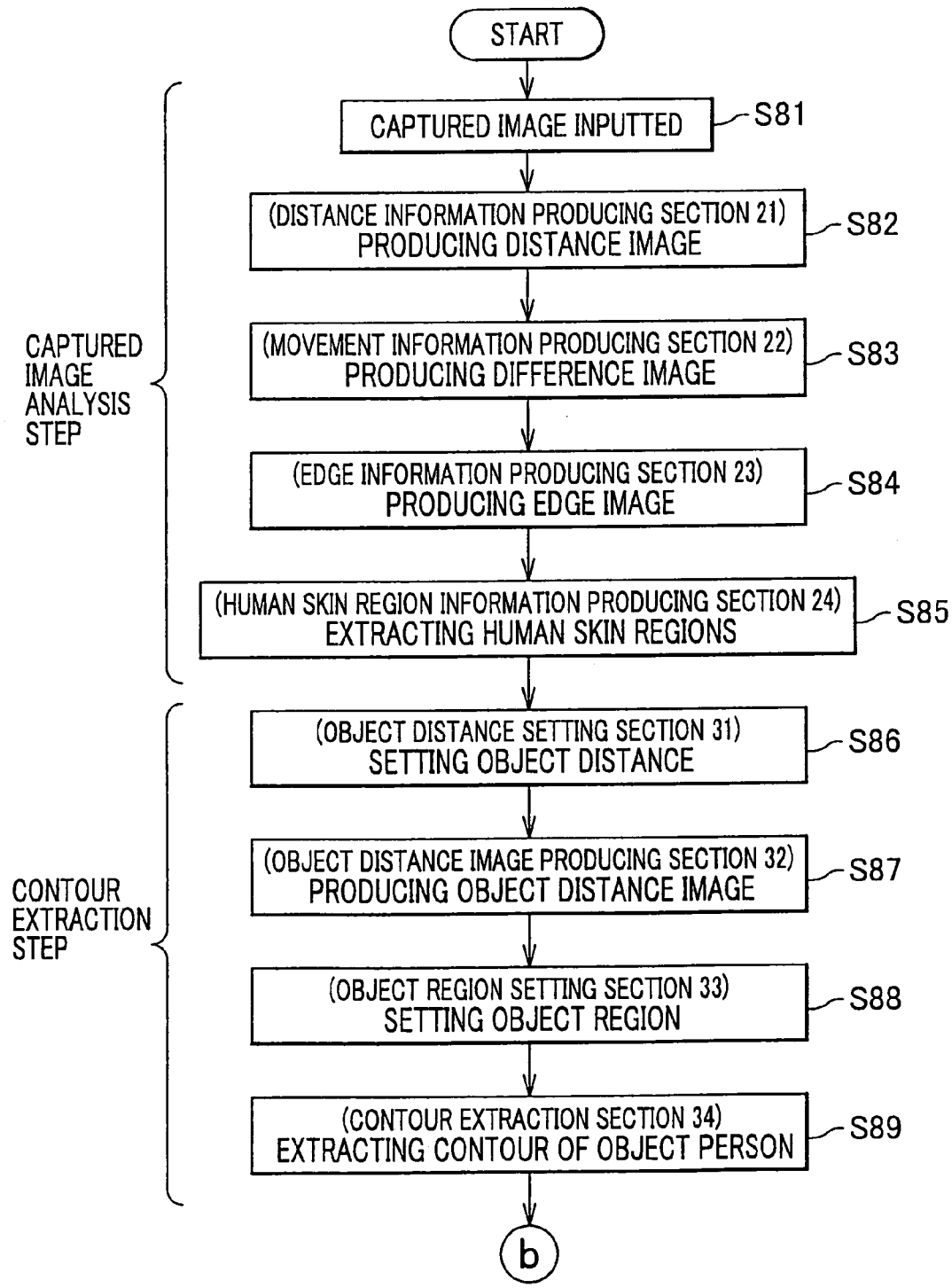
FIG. 20 is a flow chart explaining the captured image analyzing step and the contour extracting step in the operation of the gesture recognition system A1.

As seen in the flow chart of FIG. 20, in the captured image analysis device 2, when a captured image is inputted from the cameras 1a, 1b to the captured image analysis device 2 (step S81), the distance information producing section 21 produces from the captured image a distance image D1 (FIG. 3(a)) as the distance information (step S82) and the movement information producing section 22 produces from the captured image a difference image D2 (FIG. 3(b)) as the movement information (step S83). Further, the edge information producing section 23 produces from the captured image an edge image D3 (FIG. 3(c)) as the edge information (step S84), and the human skin region information producing section 24 extracts from the captured image human skin regions R1, R2 (FIG. 3(d)) as the human skin region information (step S85).

Contour Extraction Step

As shown in FIG. 20, in the contour extraction device 3, the object distance setting section 31 sets an object distance where the object person exists (step S86) based on the distance image D1 and the difference image D2 produced in steps S82 and S83. Subsequently, the object distance image producing section 32 produces an object distance image D4 (FIG. 4(b)) which is made by extracting pixels that exist on the object distance set in step S86 from the edge image D3 produced in step S84 (step S87).

The object region setting section 33 then sets an object region T (FIG. 5(b)) within the object distance image D4 produced in step S87 (step S88), and the contour extraction section 34 extracts a contour O of the object person C (FIG. 5(c)) within the object region T set in step S88 (step S89).

Face/Hand Fingertip Position Detecting Step

Figure 21:
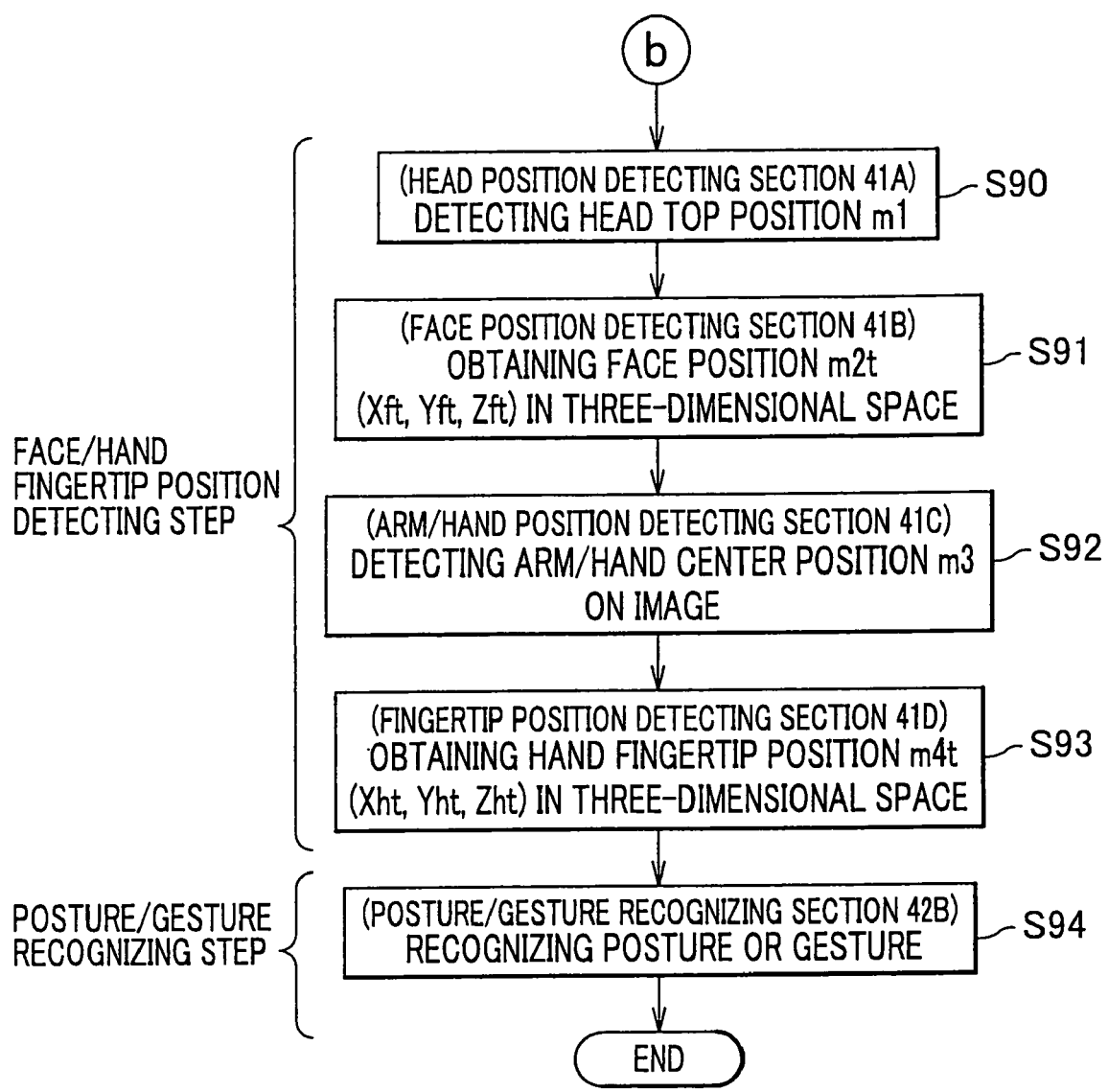
FIG. 21 is a flow chart explaining the face/fingertip position detecting step and the posture/gesture recognizing step in the operation of the gesture recognition system A1.

As seen in the flow chart of FIG. 21, in the face/fingertip position detection means 41 of the gesture recognition device 4, the head position detecting section 41A detects the head top position m1 (FIG. 7(a)) of the object person C based on the contour information produced in step S89 (step S90).

The face position detecting section 41B detects "the face position m2 on the image" (FIG. 7(b)) based on the head top position m1 detected in step S90 and the human skin region information produced in step S85, and from "the face position m2 (Xf, Yf) on the image" detected, obtains "the face position m2t (Xft, Yft, Zft) in three-dimensional space (real space)" with reference to the distance information produced in step S82 (step S91).

The arm/hand position detecting section 41C then detects "the arm/hand position m3 on the image" (FIG. 8(a)) from "the face position m2 on the image" detected in step S91 (step S92).

Next, the fingertip position detecting section 41D detects "the hand fingertip position m4 on the image" (FIG. 8(b)) based on "the face position m2 on the image" detected by the face position detecting section 41B and the arm/hand position m3 detected by the arm/hand position detecting section 41C, and from "the hand fingertip position m4 (Xh, Yh) on the image" detected, obtains "the hand fingertip position m4t (Xht, Yht, Zht) in three-dimensional space (real space)" with reference to the distance information produced in step S82 (step S93).

Posture/Gesture Recognizing Step

As seen in the flow chart of FIG. 18, in the posture/gesture recognition means 42 of the gesture recognition device 4, the posture/gesture recognizing section 42B detects "the relative position between the face position m2t and the hand fingertip position m4t" and "the changes of hand fingertip position m4t relative to the face position m2t" from "the face position m2t (Xft, Yft, Zft) in three-dimensional space" and "the hand fingertip position m4t (Xht, Yht, Zht) in three-dimensional space" obtained in the steps S91 and S93, and compares the detection results with the posture data P1-P6 (FIG. 9) and the gesture data J1-J4 (FIG. 10) stored in the posture/gesture data storage section 42A to recognize postures or gestures of the object person (step S94). Because manner of recognizing postures or gestures in the posture/gesture recognizing section 42B has been described in detail, explanation thereof will be omitted.

Although the gesture recognition system A1 has been described above, the gesture recognition device 4 included in the gesture recognition system A1 may be realized by achieving each means as a function program of the computer or by operating a gesture recognition program as a combination of these function programs.

The gesture recognition system A1 may be adapted, for example, to an autonomous robot. In this instance, the autonomous robot can recognize a posture as "HAND-SHAKE" (Posture P4) (FIG. 9(d)) when a person stretches out his hand for the robot or a gesture as "HAND SWING" (Gesture J1) (FIG. 10(a)) when a person swings his hand.

Instruction with postures or gestures is advantageous when compared with instructions with sound in which: it is not affected by ambient noise, it can instruct the robot even in the case where voice can not reach, it can instruct the robot with a simple instruction even in the case where a difficult expression (or redundant expression) is required.

According to this preferred embodiment, because it is not necessary to calculate feature points (points representing feature of the movement of the object person) whenever a gesture of the object person is recognized, the amount of calculations required for the posture recognition process or the gesture recognition process can be decreased.

Second Embodiment

The arrangement and operation of the gesture recognition system A2 including a gesture recognition device 5 will be described with reference to FIGS. 22 to 28. The gesture recognition system A2 according to this preferred embodiment is substantially the same as the gesture recognition system A1 according to the first embodiment except for the gesture recognition device 5. Therefore, explanation will be given about the gesture recognition device 5, and thereafter operation of the gesture recognition system A2 will be described. Parts similar to those previously described in the first embodiment are denoted by the same reference numerals, and detailed description thereof will be omitted.

Gesture Recognition Device 5

Figure 22:
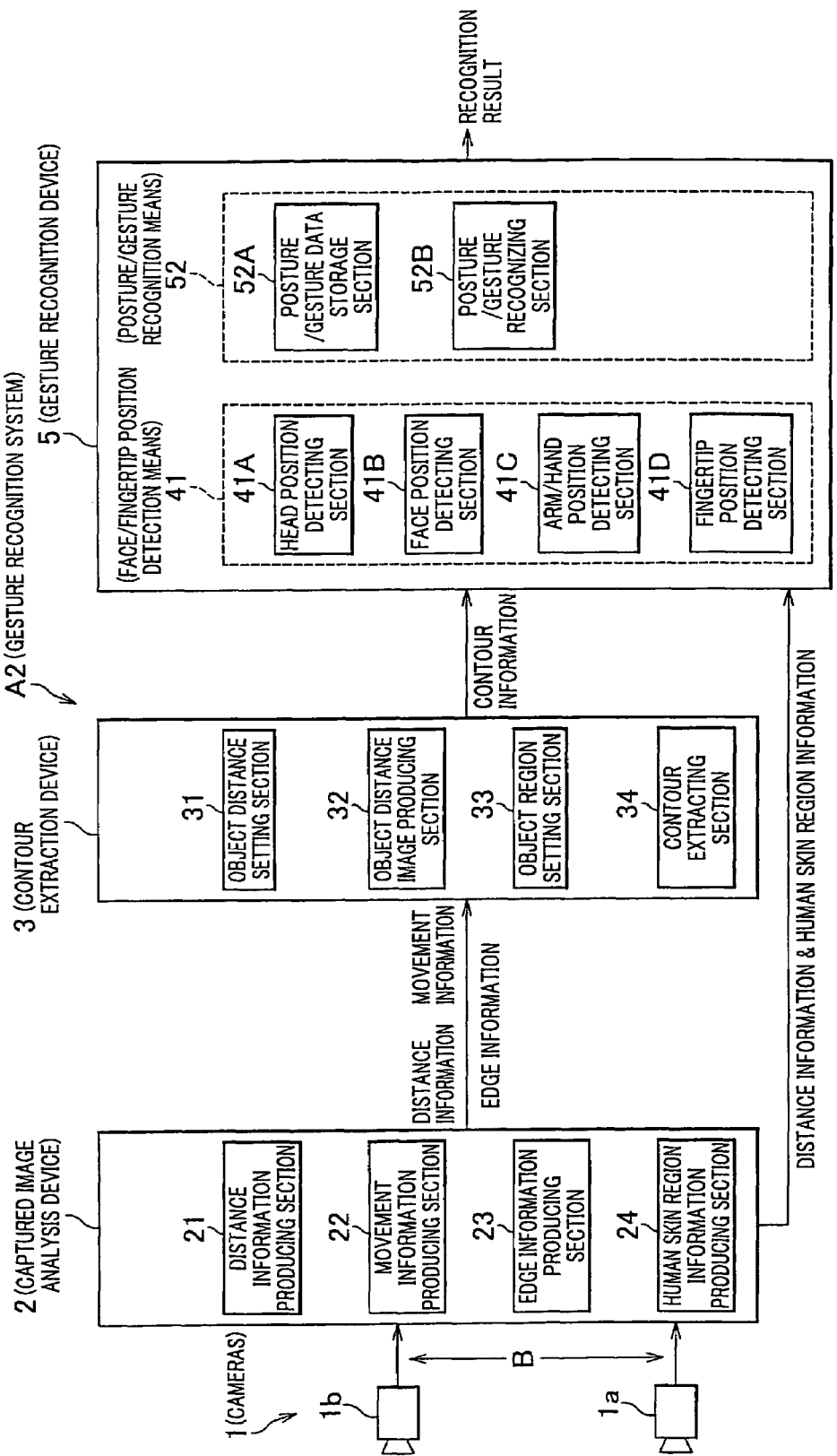
FIG. 22 is a block diagram illustrating the whole arrangement of a gesture recognition system A2.

The gesture recognition device 5 recognizes, based on the distance information and the human skin region information produced by the captured image analysis device 2 and the contour information produced by the contour extraction device 3, postures or gestures of the object person, and outputs the recognition results (see FIG. 22).

Figure 23:
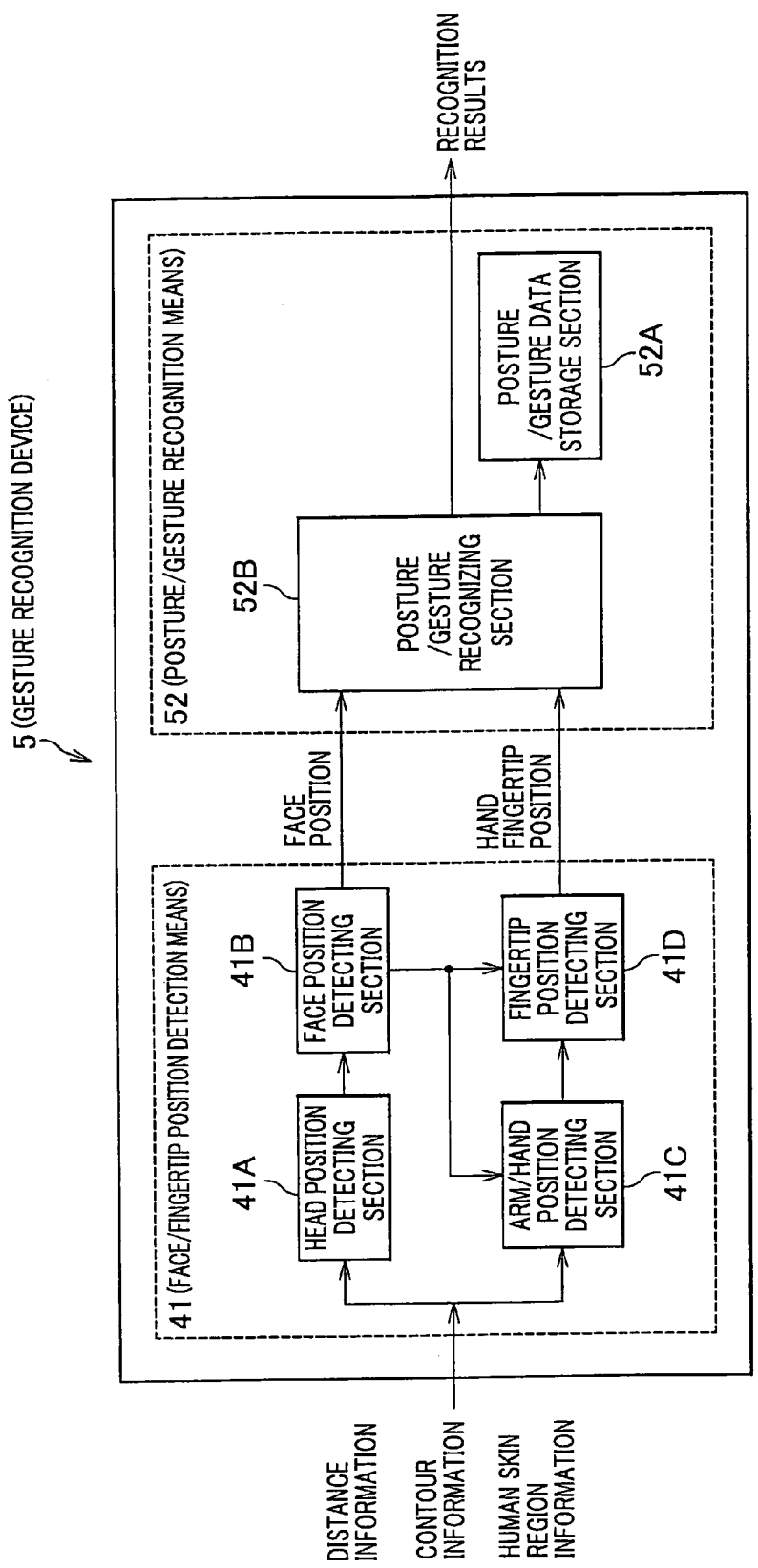
FIG. 23 is a block diagram illustrating the arrangement of a gesture recognition device 5 included in the gesture recognition system A2 of FIG. 22.

As shown in FIG. 23, the gesture recognition device 5 includes a face/fingertip position detection means 41 for detecting the face position and the hand fingertip position of the object person C in three-dimensional space (real space), and a posture/gesture recognition means 52 for recognizing a posture or a gesture of the object person based on the face position and the hand fingertip position detected by the face/fingertip position detection means 41.

Face/Fingertip Position Detection Means 41

The face/fingertip position detection means 41 includes a head position detecting section 41A for detecting a head top position of the object person in three-dimensional space, a face position detecting section 41B for detecting a face position of the object person, an arm/hand position detecting section 41C for detecting an arm/hand position of the object person, and a fingertip position detecting section 41D for detecting a hand fingertip position of the object person. Herein, the term "arm/hand" indicates a part including arm and hand, and the term "hand fingertip" indicates fingertips of hand.

The face/fingertip position detection means 41 is the same as the face/fingertip position detection means 41 in the gesture recognition system A1 according to the first embodiment, detailed description thereof will be omitted.

Posture/Gesture Recognition Means 52

The posture/gesture recognition means 52 includes a posture/gesture data storage section 52A for storing posture data and gesture data, and a posture/gesture recognizing section 52B for recognizing a posture or a gesture of the object person based on "the face position m2t in three-dimensional space" and "the hand fingertip position m4t in three-dimensional space" detected by the face/fingertip position detection means 41 (see FIG. 23).

Posture/Gesture Data Storage Section 52A

The posture/gesture data storage section 52A stores posture data P1-P2, P5-P6 (FIG. 9) and gesture data J1-J4 (FIG. 10). The posture data P1-P2, P5-P6 and the gesture data J1-J4 are data indicating postures or gestures corresponding to "the hand fingertip position relative to the face position, and the changes of the hand fingertip position". The posture data P1-P2, P5-P6 and the gesture data J1-J4 are used when the posture/gesture recognizing section 52B recognizes a posture or a gesture of the object person.

As shown in FIG. 9, the posture data P1-P2, P5-P6 will be described. In FIG. 9, (a) shows "FACE SIDE" (Posture P1) indicating "hello", (b) shows "HIGH HAND" (Posture P2) indicating "start following", (e) shows "SIDE HAND" (Posture P5) indicating "look at the hand direction", and (f) shows "LOW HAND" (Posture P6) indicating "turn to the hand direction".

As shown in FIG. 10, the gesture J1-J4 will be described. In FIG. 10, (a) shows "HAND SWING" (Gesture J1) indicating "be careful", (b) shows "BYE BYE" (Gesture J2) indicating "bye-bye", (c) shows "COME HERE" (Gesture J3) indicating "come here", and (d) shows "HAND CIRCLING" (Gesture J4) indicating "turn around".

In this preferred embodiment, the posture/gesture data storage section 52A (FIG. 23) stores the posture data P1-P2, P5-P6 (FIG. 9) and the gesture data J1-J4 (FIG. 10). However, the posture data and the gesture data stored in the posture/gesture data storage section 52A can be set arbitrarily. The meaning of each posture and gesture can also be set arbitrarily.

The posture/gesture recognizing section 52B recognizes postures or gestures of the object person by means of "Bayes method" as a statistical method. To be more specific, from "the face position m2t in three-dimensional space" and "the hand fingertip position m4 in three-dimensional space" detected by the face/fingertip position detection means 41, an average and variance of a predetermined number of frames (e.g. 5 frames) for the hand fingertip position relative to the face position m2t are obtained as a feature vector x. Based on the obtained feature vector x and by means of Bayes method, the posture/gesture recognizing section 52B calculates for all postures and gestures i a probability density of posteriori distributions of each random variable ω, and determines a posture or a gesture with the maximum probability density for each frame, so that the posture or the gesture with the maximum probability density is recognized as the posture or the gesture in the corresponding frame.

With reference to the flow charts shown in FIGS. 24 and 25, the posture/gesture recognition method at the posture/gesture recognizing section 52B will be described in detail. The outline of the process at the posture/gesture recognizing section 52B will be described firstly with reference to the flow chart shown in FIG. 24, and the posture/gesture recognition process (step S101) shown in the flow chart of FIG. 24 will be described with reference to the flow chart of FIG. 25.

Outline of Process at Posture/Gesture Recognizing Section 52B

Figure 24:
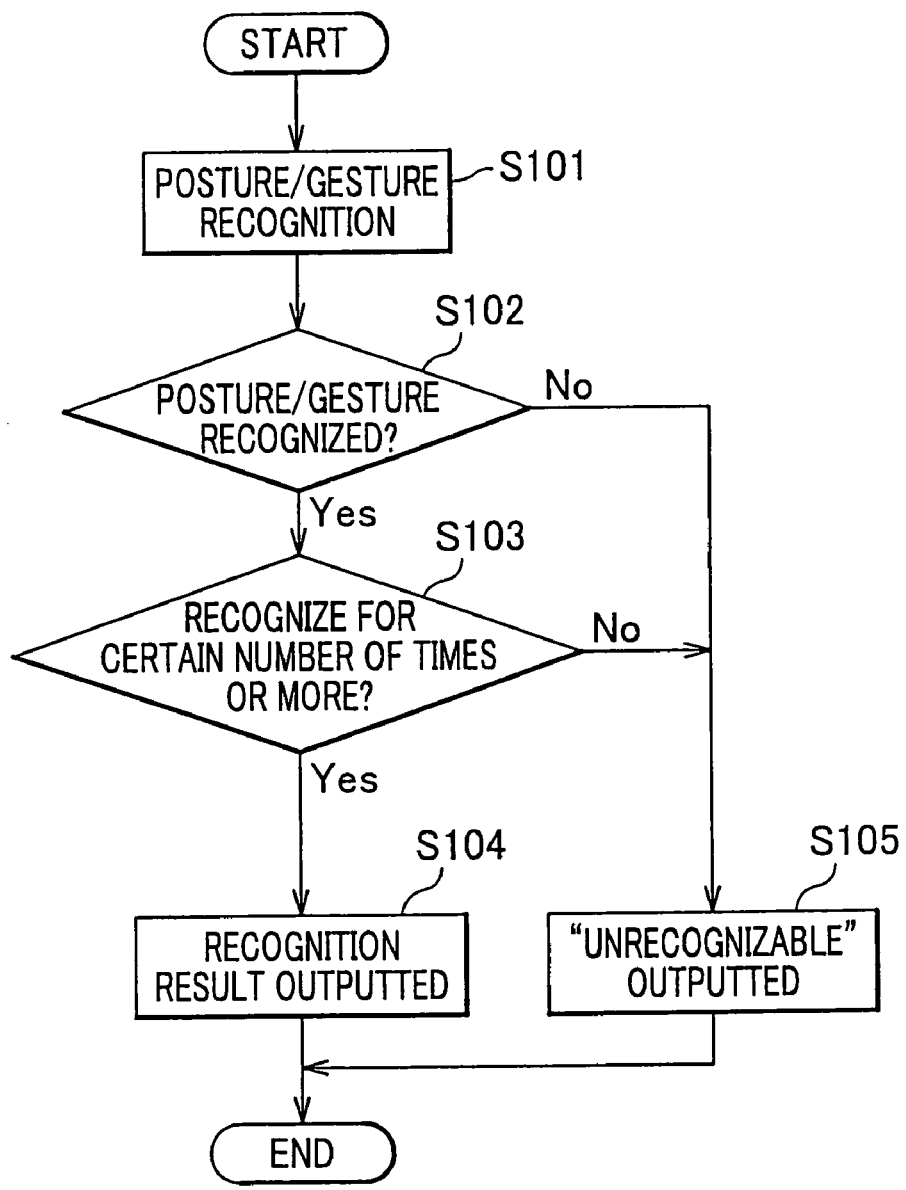
FIG. 24 is a flow chart explaining the outline of the process at the posture/gesture recognizing section 52B.

As seen in the flow chart of FIG. 24, postures or gestures are recognized in step S101. Next, in step S102, a determination is made as to whether a posture or a gesture was recognized in step S101. If it is determined that a posture or a gesture was recognized, operation proceeds to step S103. If it is not determined that a posture or a gesture was recognized, then operation proceeds to step S105.

In step S103, a determination is made as to whether the same posture or gesture is recognized for a certain number of times (e.g. 5 times) or more in a predetermined past frames (e.g. 10 frames). If it is determined that the same posture or gesture was recognized for a certain number of time or more, operation proceeds to step S104. If it is not determined that the same posture or gesture was recognized for a certain number of times or more, then operation proceeds to step S105.

In step S104, the posture or gesture recognized in step S101 is outputted as a recognition result and the process is completed. Also, in step S105, "unrecognizable" is outputted indicating that a posture or a gesture was not recognized, and the process is completed.

Step S101: Posture/Gesture Recognition Process

Figure 25:
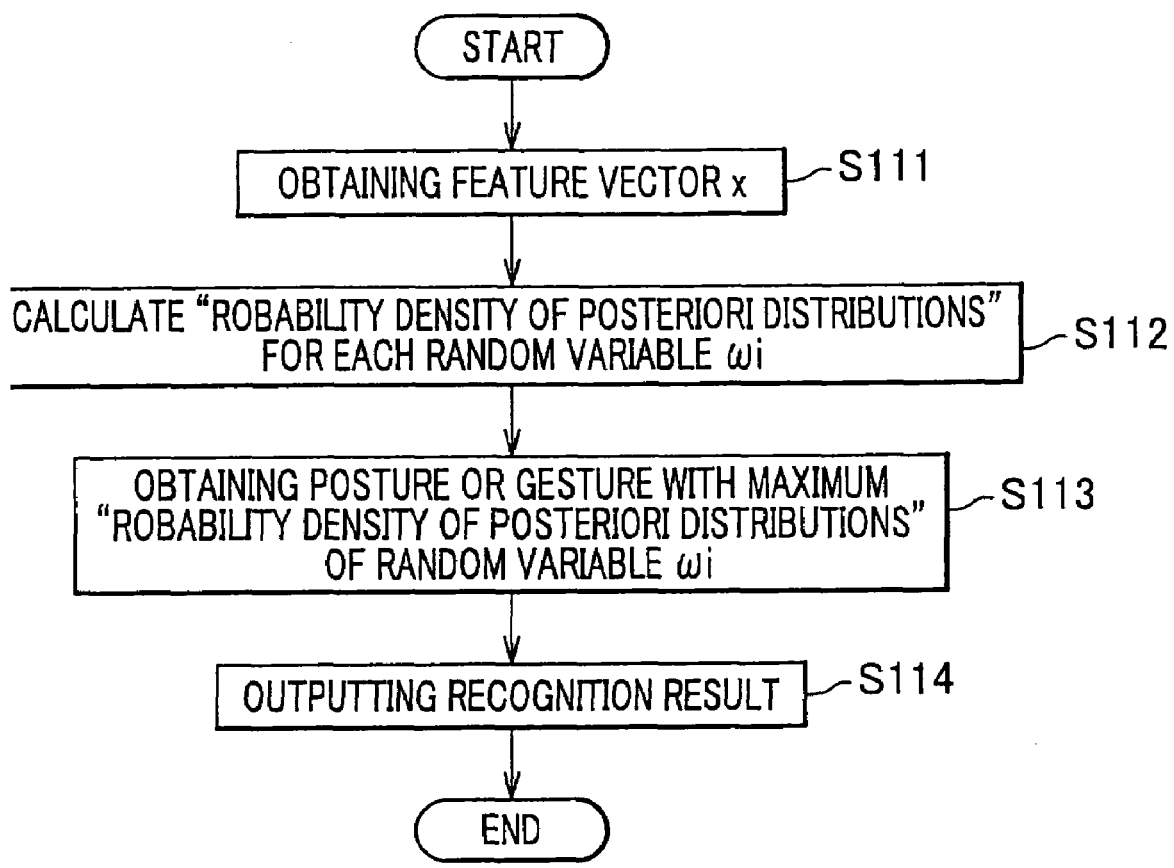
FIG. 25 is a flow chart explaining the posture/gesture recognition process (step S101) shown in the flow chart of FIG. 24.

As seen in the flow chart of FIG. 25, in step Sill, from "the face position m2t (Xft, Yft, Zft) in three-dimensional space" and "the hand fingertip position m4t (Xht, Yht, Zht) in three-dimensional space" detected by the face/fingertip position detection means 41, the posture/gesture recognizing section 52B obtains "the average and variance of a predetermined number of frames (e.g. 5 frames) for the hand fingertip position relative to the face position m2t" as a feature vector $X\ (\overline{X}, \overline{Y}, \overline{Z}), (S_X, S_Y, S_Z)$.

In the next step S112, based on feature vector x obtained in step S111 and by means of Bayes method, the posture/gesture recognizing section 52B calculates for all postures and gestures i "a probability density of posteriori distributions" of each random variable ωi.

Manner of calculating "the probability density of posteriori distributions" in step S112 will be described. When a feature vector x is given, the probability density P (ωi|x) wherein the feature vector x is a certain posture or gesture i is obtained by the following equation (1) that is so-called "Bayes' theorem". The random variable ωi is previously set for each posture or gesture.

$$P(\omega i \mid X) = \frac{P(X \mid \omega i) P(\omega i)}{P(X)} \quad (1)$$

In the equation (1), P(X|ωi) represents "a conditional probability density" wherein the image contains the feature vector x on condition that a posture or gesture i is given. This is given by the following equation (2). The feature vector x has a covariance matrix Σ and is followed by the normal distribution of the expectation $\overline{X}$.

$$P(X \mid \omega i) = \frac{1}{2\pi \sqrt{|\Sigma|}} e^{-(X-\overline{X}, \Sigma^{-1}(X-\overline{X}))/2} \quad (2)$$

In the equation (1), P(ωi) is "the probability density of prior distributions" for the random variable ωi, and is given by the following equation (3). P(ωi) is the normal distribution at the expectation ωio and the variance V [ωio].

$$P(\omega i) = \frac{1}{\sqrt{2\pi V[\omega io]}} e^{-(\omega i - \omega io)^2 / 2V[\omega io]} \quad (3)$$

Because the denominator of the right term in the equation (1) does not depend on ωi, from the equations (2) and (3), "the probability density of posteriori distributions" for the random variable ωi is given by the following equation (4).

$$P(\omega i \mid X) \propto P(X \mid \omega i) P(\omega i) = \quad (4)$$

$$\frac{1}{\sqrt{2\pi}^3 \sqrt{|\Sigma||V[\omega io]|}} e^{-(\omega i - \omega io)^2 / 2V[\omega io] - (X - \overline{X}, \Sigma^{-1}(X - \overline{X}))/2}$$

Returning to the flow chart of FIG. 25, in step S113, the posture/gesture recognizing section 52B determines a posture or a gesture with the maximum "probability density of posteriori distributions" for each frame. In the subsequent step S114, the recognition result is outputted such that the posture or the gesture obtained in step S113 is the posture or gesture for each frame, and the process is completed.

Figure 26:
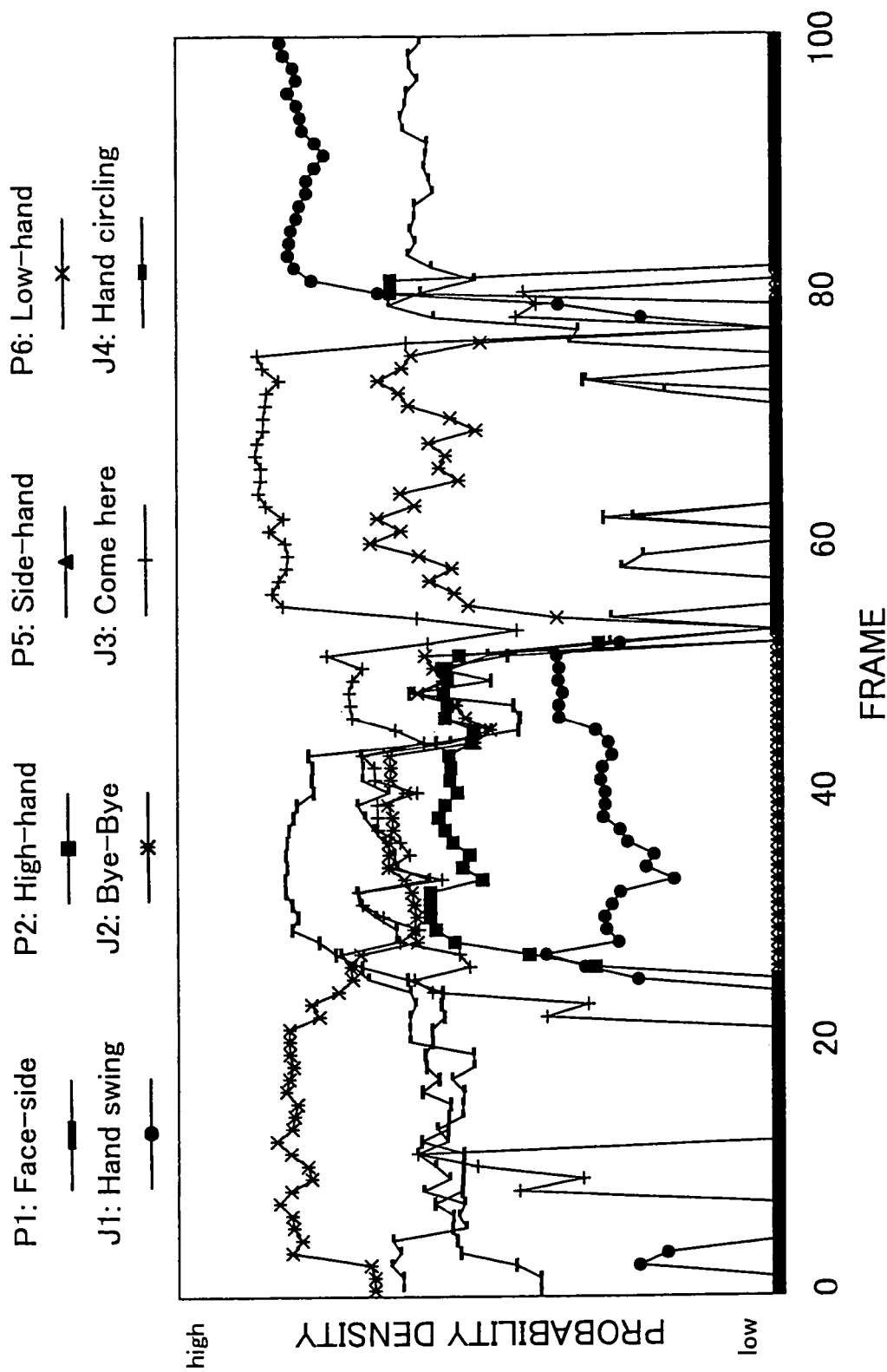
FIG. 26 is a graph showing for postures P1, P2, P5, P6 and gestures J1 to J4 a probability density of posteriori distributions of each random variable $\omega i$ in the range of frame 1 to frame 100.

FIG. 26 is a graph showing for postures P1, P2, P5, P6 and gestures J1 to J4 "the probability density of posteriori distributions" of each random variable ωi in the range of frame 1 to frame 100. Herein, the postures P1, P2, P5, P6 and the gestures J1-J4 are given as "i (i=1 to 8)".

As seen in FIG. 26, because the probability density for "BYE BYE" (Gesture J2) becomes the maximum in the frames 1 to 26, in the frames 1 to 26, the posture or gesture of the object person is recognized as "BYE BYE" (Gesture J2) (see FIG. 10(b)). Meanwhile, in the frames 27 to 43, because the probability density for "FACE SIDE" (Posture P1) becomes the maximum, in the frames 27 to 43, the posture or gesture of the object person is recognized as "FACE SIDE" (Posture P1) (see FIG. 9(a)).

In the frames 44 to 76, because the probability density for "COME HERE" (Gesture J3) becomes the maximum, the posture or gesture of the object person in the frames 44 to 76 is recognized as "COME HERE" (Gesture J3) (see FIG. 10(c)). In the frames 80 to 100, because the probability density for "HAND SWING" (Gesture J1) becomes the maximum, the posture or gesture of the object person in the frames 80 to 100 is recognized as "HAND SWING" (Gesture J1) (see FIG. 10(a)).

In the frames 77 to 79, the probability density for "HAND CIRCLING" (Gesture J4) becomes the maximum. However, because the "HAND CIRCLING" is recognized only for three times, the posture or gesture of the object person is not recognized as "HAND CIRCLING" (Gesture J4). This is because the posture/gesture recognizing section 52B recognizes the posture or the gesture only when the same posture or gesture is recognized for a certain number of times (e.g. 5 times) or more in a predetermined past frames, (e.g. 10 frames) (see steps S103 to S105 in the flow chart of FIG. 24).

As described above, by means of Bayes method, the posture/gesture recognizing section 52B calculates for all postures and gestures i(i=1 to 8) "a probability density of posteriori distribution" of each random variable ωi, and determines a posture or a gesture with the maximum "probability density of posteriori distribution" for each frame, to recognize a posture or a gesture of the object person.

Operation of Gesture Recognition System A2

Operation of the gesture recognition system A2 will be described with reference to the block diagram of FIG. 22 and the flow charts of FIGS. 27 and 28.

Captured Image Analysis Step

Figure 27:
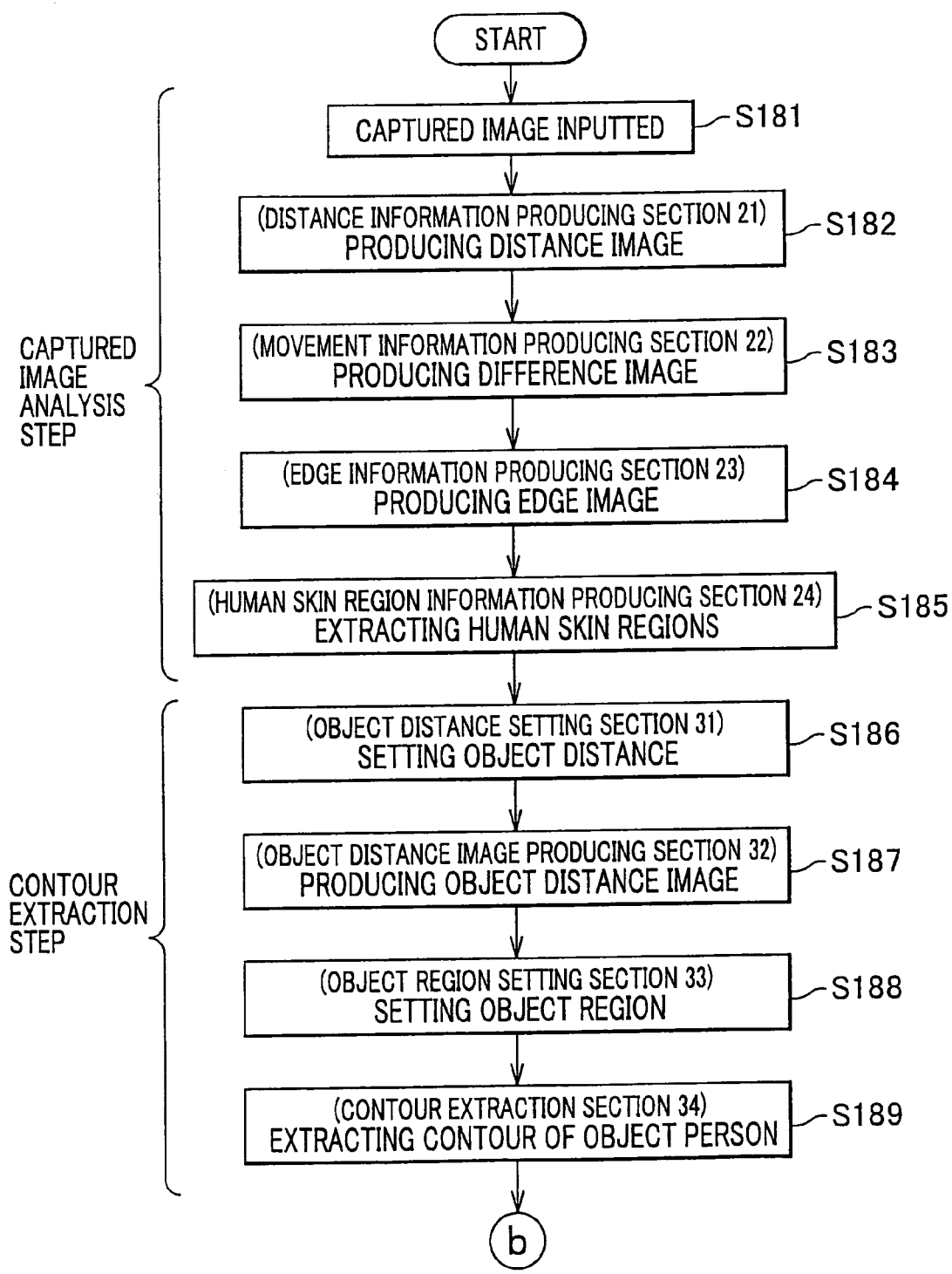
FIG. 27 is a flow chart explaining the captured image analyzing step and the contour extracting step in the operation of the gesture recognition system A2.

As seen in the flow chart of FIG. 27, in the captured image analysis device 2, when a captured image is inputted from the cameras 1a, 1b to the captured image analysis device 2 (step S181), the distance information producing section 21 produces from the captured image a distance image D1 (FIG. 3(a)) as the distance information (step S182) and the movement information producing section 22 produces from the captured image a difference image D2 (FIG. 3(b)) as the movement information (step S183). Further, the edge information producing section 23 produces from the captured image an edge image D3 (FIG. 3(c)) as the edge information (step S184), and the human skin region information producing section 24 extracts from the captured image human skin regions R1, R2 (FIG. 3(d)) as the human skin region information (step S185).

Contour Extraction Step

As shown in FIG. 27, in the contour extraction device 3, the object distance setting section 31 sets an object distance where the object person exists (step S186) based on the distance image D1 and the difference image D2 produced in steps S182 and S183. Subsequently, the object distance image producing section 32 produces an object distance image D4 (FIG. 4(b)) which is made by extracting pixels that exist on the object distance set in step S186 from the edge image D3 produced in step S184 (step S187).

The object region setting section 33 then sets an object region T (FIG. 5(b)) within the object distance image D4 produced in step S187 (step S188), and the contour extraction section 34 extracts a contour O of the object person C (FIG. 5(c)) within the object region T set in step S188 (step S189).

Face/Hand Fingertip Position Detecting Step

Figure 28:
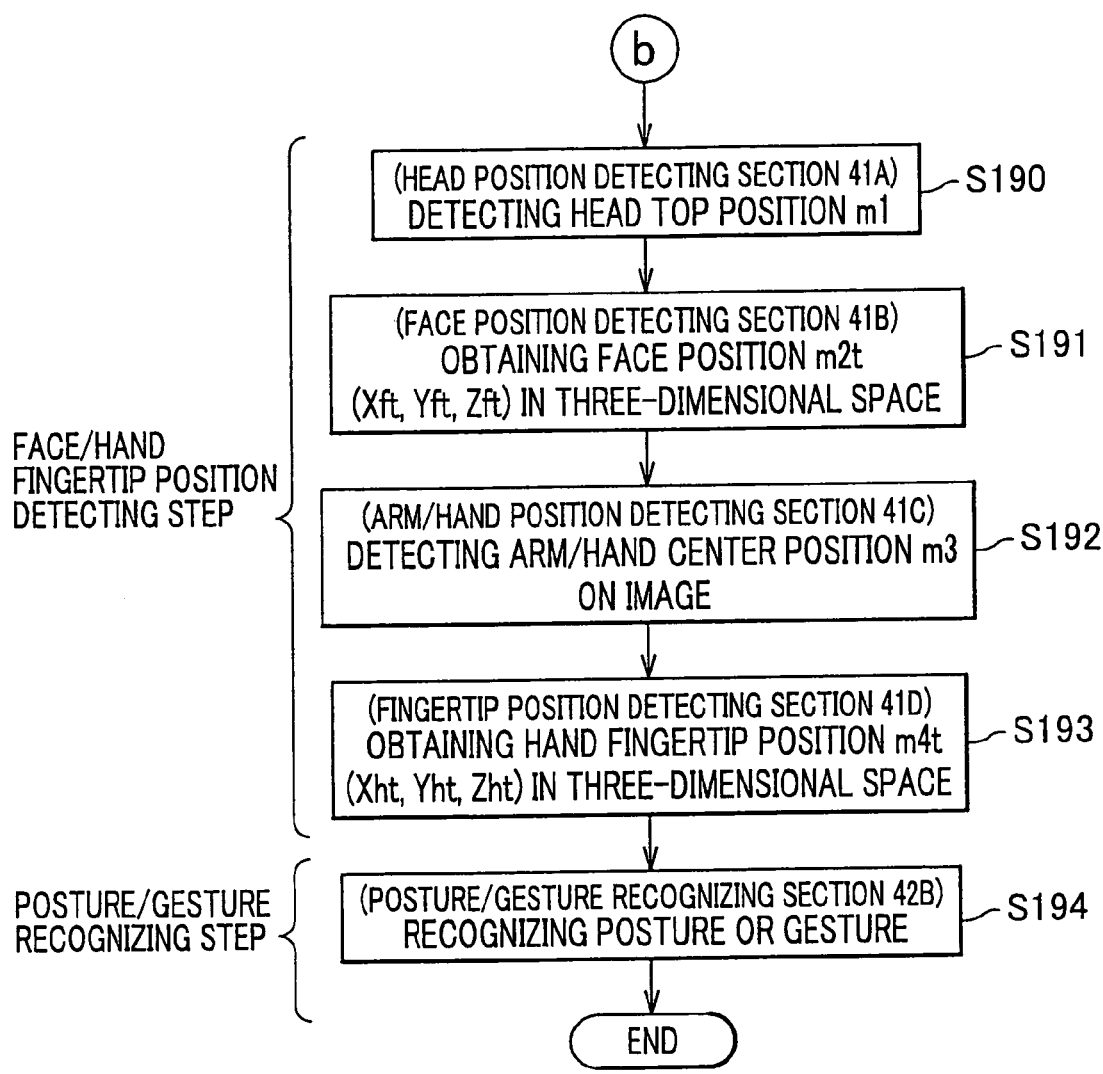
FIG. 28 is a flow chart explaining the face/fingertip position detecting step and the posture/gesture recognizing step in the operation of the gesture recognition system A2.

As seen in the flow chart of FIG. 28, in the face/fingertip position detection means 41 of the gesture recognition device 5, the head position detecting section 41A detects the head top position m1 (FIG. 7(a)) of the object person C based on the contour information produced in step S189 (step S190).

The face position detecting section 41B detects "the face position m2 on the image" (FIG. 7(b)) based on the head top position m1 detected in step S190 and the human skin region information produced in step S185, and from "the face position m2 (Xf, Yf) on the image" detected, obtains "the face position m2t (Xft, Yft, Zft) in three-dimensional space (real space)" with reference to the distance information produced in step S182 (step S191).

The arm/hand position detecting section 41C then detects "the arm/hand position m3 on the image" (FIG. 8(a)) from "the face position m2 on the image" detected in step S191 (step S192).

Next, the fingertip position detecting section 41D detects "the hand fingertip position m4 on the image" (FIG. 8(b)) based on "the face position m2 on the image" detected by the face position detecting section 41B and the arm/hand position m3 detected by the arm/hand position detecting section 41C, and from "the hand fingertip position m4 (Xh, Yh) on the image" detected, obtains "the hand fingertip position m4t (Xht, Yht, Zht) in three-dimensional space (real space)" with reference to the distance information produced in step S182 (step S193).

Posture/Gesture Recognizing Step

As seen in the flow chart of FIG. 28, the posture/gesture recognizing section 52B of the gesture recognition device 5 recognizes postures or gestures of the object person by means of "Bayes method" as a statistical method. Because manner of recognizing postures or gestures in the posture/gesture recognizing section 52B has been described in detail, explanation thereof will be omitted.

Although the gesture recognition system A2 has been described above, the gesture recognition device 5 included in the gesture recognition system A2 may be realized by achieving each means as a function program of the computer or by operating a gesture recognition program as a combination of these function programs.

The gesture recognition system A2 maybe adapted, for example, to an autonomous robot. In this instance, the autonomous robot can recognize a posture as "HIGH HAND" (Posture P2) (FIG. 9(b)) when a person raises his hand or a gesture as "HAND SWING" (Gesture J1) (FIG. 10(a)) when a person swings his hand.

Instruction with postures or gestures is advantageous when compared with instructions with sound in which: it is not affected by ambient noise, it can instruct the robot even in the case where voice can not reach, it can instruct the robot with a simple instruction even in the case where a difficult expression (or redundant expression) is required.

According to this preferred embodiment, because it is not necessary to calculate feature points (points representing feature of the movement of the object person) whenever a gesture of the object person is recognized, the amount of calculations required for the posture recognition process or the gesture recognition process can be decreased when compared with the conventional gesture recognition method.

While the present invention has been described in detail with reference to specific embodiments thereof, it will be apparent to one skilled in the art that various changes and modifications may be made without departing from the scope of the claims.

What is claimed is:

1. A gesture recognition apparatus for recognizing postures or gestures of an object person based on images of the object person captured by cameras, comprising:
    a three dimensional face and fingertip position detection means for detecting a face position and a fingertip position of the object person in three-dimensional space based on three dimensional information to be produced by the images captured, wherein the three dimensional information comprises contour information, human skin region information, and distance information of the object person with respect to the cameras based on a parallax of the images captured by the cameras; and
    a posture or gesture recognition means which operates to detect changes of the fingertip position by detecting a relative position between the face position and the fingertip position and changes of the fingertip position relative to the face position, to process the detected changes by comparing the detected changes with posture data or gesture data previously stored, to determine whether the detected changes are a posture or a gesture of the object person, and to recognize a posture or a gesture of the object person,
    wherein the posture or gesture recognition means sets in the detected changes a determination region with a sufficient size for a hand of the object person, and compares an area of the hand with an area of the determination region to determine whether the compared detected changes corresponds to the gesture data or the posture data, thereby to distinguish postures from gestures, which are similar in relative position between the face position and the fingertip position.

2. A gesture recognition apparatus according to claim 1, wherein the relative position between the face position and the fingertip position is detected by comparing heights thereof and distances thereof from the cameras.

3. A gesture recognition apparatus according to claim 1, wherein the posture or gesture recognition means recognizes postures or gestures of the object person by means of pattern matching.

4. A gesture recognition apparatus according to claim 1, wherein the predetermined method is to calculate a feature vector from an average and variance of a predetermined number of frames for an arm and hand position or a hand fingertip position, and the previously stored method is to calculate for all postures or gestures a probability density of posteriori distributions of each random variable based on the feature vector and by means of a statistical method so as to determine a posture or a gesture with a maximum probability density.

5. A gesture recognition apparatus according to claim 4, wherein the posture or gesture recognition means recognizes a posture or a gesture of the object person when a same posture or gesture is repeatedly recognized for a certain times or more in a certain number of frames.

6. A gesture recognition apparatus according to claim 1, wherein the three dimensional face and fingertip position detection means detects the fingertip position of the object person by
    detecting an arm or hand position based on the contour information and the human skin information;
    searching for top-bottom end points and right-left end points of human-skin region based on the detected arm or hand position and the human skin region information;
    comparing a vertical direction distance between the top-bottom end points and a horizontal direction distance between the right-left end points, and
    determining either the vertical distance or the horizontal distance that has a longer distance to be a direction where the fingertips extend, and determining which point of the top-bottom end points and the right-left end points is the fingertip position.

7. A gesture recognition method for recognizing postures or gestures of an object person based on images of the object person captured by cameras, comprising:
    at least one processor performing the steps of:
        a face and fingertip position detecting step for detecting a face position and a fingertip position of the object person in three-dimensional space based on three-dimensional information to be produced by the images captured, wherein the three-dimensional information comprises contour information, human skin region information, and the distance information of the object person with respect to the cameras based on a parallax of the images captured by the cameras; and
        a posture or gesture recognizing step for detecting changes of the fingertip position by detecting a relative position between the face position and the fingertip position and changes of the fingertip position relative to the face position, processing the detected changes by comparing the detected changes with posture data or gesture data previously stored, determining whether the detected changes are a posture or a gesture of the object person, and recognizing a posture or a gesture of the object person, wherein the posture or gesture recognizing step sets in the detected changes a determination region with a sufficient size for a hand of the object person, and compares an area of the hand with an area of the determination region to determine whether the compared detected changes corresponds to the gesture data or the posture data, thereby to distinguish postures from gestures, which are similar in relative position between the face position and the fingertip position.

8. A gesture recognition method according to claim 7, wherein the predetermined method is to calculate a feature vector from an average and variance of a predetermined number of frames for an arm and hand position or a hand fingertip position, and the previously stored method is to calculate for all postures or gestures a probability density of posteriori distributions of each random variable based on the feature vector and by means of a statistical method so as to determine a posture or a gesture with a maximum probability density.

9. A gesture recognition method according to claim 7, wherein the face and fingertip position detecting comprising detecting the fingertip position of the object person by
- detecting an arm or hand position based on the contour information and the human skin information;
- searching for top-bottom end points and right-left end points of human-skin region based on the detected arm or hand position and the human skin region information;
- comparing a vertical direction distance between the top-bottom end points and a horizontal direction distance between the right-left end points, and
- determining either the vertical distance or the horizontal distance that has a longer distance to be a direction where the fingertips extend, and determining which point of the top-bottom end points and the right-left end points is the fingertip position.

10. A computer program embodied on a computer readable medium, the computer readable medium storing code comprising computer executable instructions configured to perform a gesture recognition method for recognizing postures or gestures of an object person based on images of the object person captured by cameras, comprising:
- detecting a face and fingertip position comprising three-dimensional detecting of a face position and a fingertip position of the object person in three-dimensional space based on three-dimensional information to be produced by the images captured, wherein the three-dimensional information comprises contour information, human skin region information, and the distance information of the object person with respect to the cameras based on a parallax of the images captured by the cameras; and
- recognizing a posture or gesture, comprising detecting changes of the fingertip position by detecting a relative position between the face position and the fingertip position and changes of the fingertip position relative to the face position, processing the detected changes by comparing the detected changes with posture data or gesture data previously stored, determining whether the detected changes are a posture or a gesture of the object person, and recognizing the posture or a gesture of the object person,
- wherein the recognizing the posture or the gesture sets in the detected changes a determination region with a sufficient size for a hand of the object person, and compares an area of the hand with an area of the determination region to determine whether the compared, detected changes corresponds to the gesture data or the posture data, thereby to distinguish postures from gestures, which are similar in relative position between the face position and the fingertip position.

11. A computer program according to claim 10, wherein the detecting of changes of the fingertip position comprises calculating a feature vector from an average and variance of a predetermined number of frames for an arm and hand position or a hand fingertip position, and wherein the processing of the detected changes comprises calculating for all postures or gestures a probability density of posteriori distributions of each random variable based on the feature vector and by means of a statistical method so as to determine a posture or a gesture with a maximum probability density.

12. A computer program according to claim 10, wherein the detecting a face and fingertip position comprises detecting the fingertip position of the object person by
- detecting an arm or hand position based on the contour information and the human skin information;
- searching for top-bottom end points and right-left end points of human-skin region based on the detected arm or hand position and the human skin region information;
- comparing a vertical direction distance between the top-bottom end points and a horizontal direction distance between the right-left end points, and
- determining either the vertical distance or the horizontal distance that has a longer distance to be a direction where the fingertips extend, and determining which point of the top-bottom end points and the right-left end points is the fingertip position.

* * * * *